(12) United States Patent
Zhou et al.

(10) Patent No.: US 11,521,496 B2
(45) Date of Patent: Dec. 6, 2022

(54) LANE-BORROWING VEHICLE DRIVING METHOD AND CONTROL CENTER

(71) Applicant: Huawei Technologies Co., Ltd., Shenzhen (CN)

(72) Inventors: Jianli Zhou, Shenzhen (CN); Hui Li, Shenzhen (CN); Fuxiang Xiong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 244 days.

(21) Appl. No.: 16/856,424

(22) Filed: Apr. 23, 2020

(65) Prior Publication Data
US 2020/0250987 A1    Aug. 6, 2020

Related U.S. Application Data

(63) Continuation of application No. PCT/CN2018/111668, filed on Oct. 24, 2018.

(30) Foreign Application Priority Data

Oct. 24, 2017  (CN) .......................... 201711004285.6

(51) Int. Cl.
*G08G 1/16*        (2006.01)
*G08G 1/01*        (2006.01)
(Continued)

(52) U.S. Cl.
CPC ......... *G08G 1/167* (2013.01); *B60W 30/0956* (2013.01); *B60W 30/18163* (2013.01);
(Continued)

(58) Field of Classification Search
CPC ...... G08G 1/167; G08G 1/0112; G08G 1/161; G08G 1/164; G08G 1/0133; G08G 1/0145;
(Continued)

(56) References Cited

U.S. PATENT DOCUMENTS

2005/0004744 A1*  1/2005  Dieckmann ........ B60K 31/0008
                                                                180/170
2007/0268067 A1*  11/2007  Bernhard .............. G01S 5/0252
                                                                327/558
(Continued)

FOREIGN PATENT DOCUMENTS

CN       101751788 A       6/2010
CN       102157072 A       8/2011
(Continued)

*Primary Examiner* — B M M Hannan
(74) *Attorney, Agent, or Firm* — Conley Rose, P.C.

(57) ABSTRACT

A lane-borrowing vehicle driving method includes generating, by a control center, a first lane-borrowing driving policy of the vehicle based on a lane-borrowing requirement, a moving trend of the vehicle, and a preset traffic rule, where the lane-borrowing requirement includes a lane-borrowing driving reason, and the first lane-borrowing driving policy includes an instruction for controlling lane-borrowing driving of the vehicle, and sending, by the control center, the first lane-borrowing driving policy to the vehicle. The embodiments of this application are used for temporary lane-borrowing driving and lane-borrowing driving on a tidal lane.

28 Claims, 12 Drawing Sheets

(51) Int. Cl.
*B60W 30/18* (2012.01)
*G05D 1/02* (2020.01)
*G01C 21/36* (2006.01)
*B60W 30/095* (2012.01)

(52) U.S. Cl.
CPC ....... *G01C 21/3691* (2013.01); *G05D 1/0212* (2013.01); *G05D 1/0287* (2013.01); *G08G 1/0112* (2013.01); *G08G 1/161* (2013.01); *G08G 1/164* (2013.01); *B60W 2552/05* (2020.02); *B60W 2555/20* (2020.02); *B60W 2555/60* (2020.02)

(58) Field of Classification Search
CPC ....... G08G 1/096741; G08G 1/096775; G08G 1/0962; B60W 30/0956; B60W 30/18163; B60W 2552/05; B60W 2555/20; B60W 2555/60; G01C 21/3691; G05D 1/0212; G05D 1/0287
USPC .................................................... 701/23, 26
See application file for complete search history.

(56) References Cited

U.S. PATENT DOCUMENTS

| | | |
|---|---|---|
| 2013/0158800 A1 | 6/2013 | Trageser |
| 2014/0227991 A1 | 8/2014 | Breton et al. |
| 2015/0312327 A1* | 10/2015 | Fowe ............... G08G 1/096716 701/426 |
| 2015/0344033 A1* | 12/2015 | Fukuda ................. B60W 30/16 701/117 |
| 2016/0114811 A1* | 4/2016 | Matsuno ............... B60W 10/20 701/23 |
| 2016/0176341 A1* | 6/2016 | Raghu ............ B60W 30/18163 348/148 |
| 2016/0357188 A1* | 12/2016 | Ansari ................. G05D 1/0274 |
| 2017/0031361 A1* | 2/2017 | Olson ............... B60W 50/0097 |
| 2017/0249839 A1 | 8/2017 | Becker et al. |
| 2017/0278388 A1* | 9/2017 | Bansal ................. G08G 1/0125 |
| 2018/0143033 A1* | 5/2018 | Hu ..................... G01C 21/3617 |
| 2018/0309712 A1* | 10/2018 | Jeong ................. H04L 61/3025 |
| 2019/0291744 A1* | 9/2019 | Mimura ............... B60W 10/20 |
| 2019/0384294 A1* | 12/2019 | Shashua ............... G06V 20/584 |

FOREIGN PATENT DOCUMENTS

| | | |
|---|---|---|
| CN | 103500508 A | 1/2014 |
| CN | 104115198 A | 10/2014 |
| CN | 104185860 A | 12/2014 |
| CN | 104269073 A | 1/2015 |
| CN | 104778844 A | 7/2015 |
| CN | 104882019 A | 9/2015 |
| CN | 105788322 A | 7/2016 |
| CN | 105957372 A | 9/2016 |
| CN | 106384518 A | 2/2017 |
| CN | 106971624 A | 7/2017 |
| CN | 107195189 A | 9/2017 |
| CN | 107909837 A | 4/2018 |

* cited by examiner

LANE-BORROWING VEHICLE DRIVING METHOD AND CONTROL CENTER

CROSS-REFERENCE TO RELATED APPLICATIONS

This application is a continuation of International Patent Application No. PCT/CN2018/111668, filed on Oct. 24, 2018, which claims priority to Chinese Patent Application No. 201711004285.6, filed on Oct. 24, 2017, both of which are hereby incorporated by reference in their entireties.

TECHNICAL FIELD

This application relates to the field of big data processing, and in particular, to a lane-borrowing vehicle driving method and a control center.

BACKGROUND

On a road, such as a mountain road or an area of a complex road condition, on which lane-borrowing is allowed in a traffic regulation, when a vehicle encounters an obstacle or has an unclear vision in front of the vehicle on a lane, the vehicle may temporarily drive into an oncoming lane for lane-borrowing driving. For a vehicle that performs lane-borrowing driving, safety of the vehicle can be ensured by relying only on experience of a driver during lane-borrowing driving. In this scenario, a safety accident probably occurs.

Currently, in other approaches, an oncoming lane overtaking warning method based on vehicle-to-vehicle (V2V) communication is proposed. In the method, whether the vehicle has an overtaking intention depends on whether a left turn light signal in controller area network (CAN) bus data of the vehicle is enabled through detection. If the vehicle has the overtaking intention, motion status information of a neighboring vehicle such as a speed, a brake pedal, and an acceleration of the neighboring vehicle, and position information of the neighboring vehicle such as a longitude and a latitude are obtained to calculate a position relationship between the vehicle and the neighboring vehicle in real time, and then dynamically calculate, based on the real-time position relationship between the vehicle and the neighboring vehicle and the motion status information, a time in which the vehicle can overtake safely. Then the calculated time in which the vehicle can overtake is compared with time thresholds of different emergency levels, and a warning indication is made for the driver based on the different emergency levels.

The technology is an intelligent oncoming lane overtaking warning method for a single vehicle. Information exchange is performed in a V2V manner. However, whether a road is allowed for lane-borrowing is not determined, the vehicle is not controlled, and aided driving is provided using only warning indications of different levels. In this way, a general cooperative awareness and coordinated control cannot be performed on vehicles on a related lane in a centralized manner, and there is a bottleneck in driving safety and driving efficiency. In addition, a manner of intelligently providing a warning indication for a single vehicle is limited to reaction and operation of a driver, and safety can hardly be ensured.

SUMMARY

Embodiments of this application provide a lane-borrowing vehicle driving method and a control center in order to resolve a problem in other approaches that only a warning indication can be provided, lane-borrowing driving of the vehicle cannot be coordinated and controlled, and safety and driving efficiency cannot be ensured.

According to a first aspect, a lane-borrowing vehicle driving method is provided, including generating, by a control center, a first lane-borrowing driving policy of the vehicle based on a lane-borrowing requirement, a moving trend of the vehicle, and a preset traffic rule, where the lane-borrowing requirement includes a lane-borrowing driving reason, and the first lane-borrowing driving policy includes an instruction for controlling lane-borrowing driving of the vehicle, and sending the first lane-borrowing driving policy to the vehicle. Compared with other approaches in which lane-borrowing driving is performed based on an experienced driver or based on only a given collision warning and reaction and operation of a driver, which is insecure, in this application, the control center may plan a lane-borrowing driving policy in real time, to improve security of lane-borrowing driving.

In a possible design, before the generating, by a control center, a first lane-borrowing driving policy of the vehicle, the method further includes receiving, by the control center, the lane-borrowing requirement sent by the vehicle, where the lane-borrowing requirement includes position information of the vehicle, an expected lane-borrowing driving track, and the lane-borrowing driving reason, the case may be applied to a temporary lane-borrowing scenario, namely, the vehicle determines there is no other lane for driving in an original lane direction, and lane-borrowing driving needs to be performed, or generating, by the control center, the lane-borrowing requirement, where the lane-borrowing driving reason included in the lane-borrowing requirement indicates that a vehicle density on a lane of any direction is greater than the preset threshold, the case may be applied to a lane-borrowing driving scenario on a tidal lane, and an oncoming lane is borrowed to improve driving efficiency when a plurality of vehicles drive slowly on one side of a road.

In a possible design, the generating, by a control center, a first lane-borrowing driving policy of the vehicle based on a lane-borrowing requirement, a moving trend of the vehicle, and a preset traffic rule includes determining, by the control center, whether a road section used for lane-borrowing driving is allowed for lane-borrowing driving of the vehicle, obtaining, by the control center when determining that the road section used for lane-borrowing driving is allowed for lane-borrowing driving of the vehicle, a driving area for lane-borrowing driving based on the lane-borrowing requirement, where the driving area includes a start-stop range of the road section used for lane-borrowing driving and a quantity of lanes used for lane-borrowing driving, selecting, by the control center, a traffic participant in a preset area based on map information of the driving area, and sending a first notification message to a traffic participant that can receive a signal in the preset area, where the first notification message is used to indicate, to the traffic participant that can receive a signal in the preset area, that lane-borrowing driving is to occur in the driving area, and generating, by the control center, a dynamic traffic status in the preset area based on the map information of the preset area and status information of the traffic participant in the preset area, where the status information of the traffic participant includes at least one of movement information of a pedestrian in the preset area, driving information of all vehicles, and traffic information collected by a roadside device, obtaining, by the control center based on the dynamic traffic status, a moving trend of the traffic participant in the preset area within a preset time after the lane-borrowing requirement is determined, and determining whether the vehicle may collide with the traffic participant in the preset area during lane-borrowing driving in the driving area, and generating, by the control center, the first lane-borrowing driving policy of the vehicle based on the lane-borrowing requirement, a moving trend of the traffic participant in the preset area within a preset time after the lane-borrowing requirement is received, and the preset traffic rule, where the moving trend of the traffic participant in the preset area includes the moving trend of the vehicle. In this way, the control center may perform lane-borrowing driving scheduling on related traffic participants including the vehicle performing lane-borrowing driving in order to ensure that the related traffic participants can avoid a collision.

In a possible design, the method further includes receiving, by the control center, the driving information sent by at least one vehicle, where the driving information includes at least one of a status, position information, a current speed, and a driving intention of the vehicle, and receiving the traffic information sent by at least one roadside device, where the traffic information includes at least one of a road condition, a traffic signal, an obstacle, and weather information. The driving information may be periodically sent by the vehicle to the control center, and the traffic information sent by the roadside device may also be periodically sent to the control center such that the control center can learn of, in real time, the driving information of the vehicle and the traffic information collected by the roadside device.

In a possible design, the first lane-borrowing driving policy includes at least one of first indication information used to indicate that the vehicle can perform lane-borrowing driving, a driving sequence and speed of the vehicle during lane-borrowing driving, and lane information. In this way, the vehicle performing lane-borrowing driving can avoid a collision with another traffic participant during lane-borrowing driving in order to safely implement lane-borrowing driving in order.

In a possible design, if the control center receives the lane-borrowing requirement sent by the vehicle, after the sending, by the control center, the first lane-borrowing driving policy to the vehicle, the method further includes sending, by the control center, a second lane-borrowing driving policy to remaining traffic participants other than the vehicle that can receive a signal and that are in traffic participants in the preset area, where the second lane-borrowing driving policy includes at least one of second indication information, a driving sequence and speed of the traffic participant, and lane information, and the second indication information is used to indicate, to the traffic participant, that the vehicle is performing lane-borrowing driving. In this way, the control center schedules not only the vehicle performing lane-borrowing driving, but also schedules another related traffic participant in order to coordinate and control all the traffic participants. In addition, the control center receives first feedback information sent by the vehicle and second feedback information sent by the remaining traffic participants that can receive a signal, where the first feedback information is used to indicate that the vehicle has received the first lane-borrowing driving policy, and the second feedback information is used to indicate that the remaining traffic participants that can receive a signal have received the second lane-borrowing driving policy. Therefore, the control center can learn of, in time, that the vehicle and other traffic participants have correctly received the instruction.

In a possible design, the method further includes receiving, by the control center, third feedback information sent by the vehicle, where the third feedback information is used to indicate that the vehicle has completed lane-borrowing driving such that the control center can learn of, in time, that the vehicle has performed vehicle control, and sending, by the control center, fourth feedback information to the remaining traffic participants that can receive a signal, where the fourth feedback information is used to indicate, to the remaining traffic participants that can receive a signal, that the vehicle has completed lane-borrowing driving. In this way, the traffic participants can cancel warning of lane-borrowing driving of the vehicle in time.

In a possible design, if the control center generates the lane-borrowing requirement, after the sending, by the control center, the first lane-borrowing driving policy to the vehicle, the method further includes receiving, by the control center, fifth feedback information sent by the vehicle, where the fifth feedback information is used to indicate that the vehicle has received the first lane-borrowing driving policy, and receiving, by the control center, sixth feedback information sent by the vehicle, where the sixth feedback information is used to indicate that the vehicle has completed lane-borrowing driving. In a scenario in which lane-borrowing driving is performed on the tidal lane, the control center can learn of, in time, that a vehicle that needs to perform lane-borrowing driving has correctly received the instruction and completed vehicle control.

In a possible design, the method further includes if the control center determines that the vehicle density on a lane of any direction is less than or equal to the preset threshold, sending, by the control center, a second notification message to a traffic participant that can receive a signal in the driving area for lane-borrowing driving, where the second notification message is used to instruct the traffic participant that can receive a signal in the driving area to end lane-borrowing driving. In a scenario of performing lane-borrowing driving on the tidal lane, the second driving message is used to restore a lane status and end lane-borrowing driving control.

According to a second aspect, a lane-borrowing vehicle driving method is provided, including receiving, by a traffic participant, a first lane-borrowing driving policy sent by a control center, where the first lane-borrowing driving policy includes an instruction for controlling lane-borrowing driving of the traffic participant, and obtaining, by the traffic participant, a control parameter based on the first lane-borrowing driving policy, driving information of the traffic participant, and road condition information collected by the traffic participant, where the control parameter is used to control lane-borrowing driving of the traffic participant. In this way, the traffic participant may safely implement lane-borrowing driving in order based on the lane-borrowing driving policy delivered by the control center and road condition information and driving information perceived by the traffic participant.

In a possible design, the first lane-borrowing driving policy includes at least one of first indication information used to indicate that the vehicle can perform lane-borrowing driving, a driving sequence and speed of the vehicle during lane-borrowing driving, and lane information, the driving information includes at least one of a status, position information, a current speed, and a driving intention of the traffic participant, and the method further includes sending, by the traffic participant, the driving information to the control center.

In a possible design, before the receiving, by a traffic participant, a first lane-borrowing driving policy sent by a control center, the method further includes sending, by the traffic participant, a lane-borrowing requirement to the control center, where the lane-borrowing requirement includes position information of the traffic participant, an expected lane-borrowing driving track, and a lane-borrowing driving reason, and after the traffic participant completes lane-borrowing driving, the method further includes sending, by the traffic participant, first feedback information to the control center, where the first feedback information is used to indicate that the vehicle has received the first lane-borrowing driving policy, and sending, by the traffic participant, third feedback information to the control center, where the third feedback information is used to indicate that the traffic participant has completed lane-borrowing driving.

In a possible design, the method further includes receiving, by the traffic participant, a notification message sent by the control center, where the notification message is used to instruct the traffic participant to end lane-borrowing driving.

According to a third aspect, a control center is provided, including a processing unit configured to generate a first lane-borrowing driving policy of the vehicle based on a lane-borrowing requirement, a moving trend of the vehicle, and a preset traffic rule, where the lane-borrowing requirement includes a lane-borrowing driving reason, and the first lane-borrowing driving policy includes an instruction for controlling lane-borrowing driving of the vehicle, and a transceiver unit configured to send the first lane-borrowing driving policy to the vehicle.

In a possible design, the transceiver unit is further configured to receive the lane-borrowing requirement sent by the vehicle, where the lane-borrowing requirement includes position information of the vehicle, an expected lane-borrowing driving track, and the lane-borrowing driving reason, or the processing unit is further configured to generate the lane-borrowing requirement, where the lane-borrowing driving reason included in the lane-borrowing requirement indicates that a vehicle density on a lane of any direction is greater than the preset threshold.

In a possible design, the processing unit is configured to determine whether a road section used for lane-borrowing driving is allowed for lane-borrowing driving of the vehicle, obtain, when determining that the road section used for lane-borrowing driving is allowed for lane-borrowing driving of the vehicle, a driving area for lane-borrowing driving based on the lane-borrowing requirement, where the driving area includes a start-stop range of the road section used for lane-borrowing driving and a quantity of lanes used for lane-borrowing driving, select a traffic participant in a preset area based on map information of the driving area, and send, using the transceiver unit, a first notification message to a traffic participant that can receive a signal in the preset area, where the first notification message is used to indicate, to the traffic participant that can receive a signal in the preset area, that lane-borrowing driving is to occur in the driving area, and generate a dynamic traffic status in the preset area based on the map information of the preset area and status information of the traffic participant in the preset area, where the status information of the traffic participant includes at least one of movement information of a pedestrian in the preset area, driving information of all vehicles, and traffic information collected by a roadside device, obtain, based on the dynamic traffic status, a moving trend of the traffic participant in the preset area within a preset time after the lane-borrowing requirement is determined, and determine whether the vehicle may collide with the traffic participant in the preset area during lane-borrowing driving in the driving area, and generate the first lane-borrowing driving policy of the vehicle based on the lane-borrowing requirement, a moving trend of the traffic participant in the preset area within a preset time after the lane-borrowing requirement is received, and the preset traffic rule, where the moving trend of the traffic participant in the preset area includes the moving trend of the vehicle.

In a possible design, the transceiver unit is further configured to receive the driving information sent by at least one vehicle, where the driving information includes at least one of a status, position information, a current speed, and a driving intention of the vehicle, and receive the traffic information sent by at least one roadside device, where the traffic information includes at least one of a road condition, a traffic signal, an obstacle, and weather information.

In a possible design, the first lane-borrowing driving policy includes at least one of first indication information used to indicate that the vehicle can perform lane-borrowing driving, a driving sequence and speed of the vehicle during lane-borrowing driving, and lane information.

In a possible design, the transceiver unit is further configured to send a second lane-borrowing driving policy to remaining traffic participants other than the vehicle that can receive a signal and that are in traffic participants in the preset area, where the second lane-borrowing driving policy includes at least one of second indication information, a driving sequence and speed of the traffic participant, and lane information, and the second indication information is used to indicate, to the traffic participant, that the vehicle is performing lane-borrowing driving, and receive first feedback information sent by the vehicle and second feedback information sent by the remaining traffic participants that can receive a signal, where the first feedback information is used to indicate that the vehicle has received the first lane-borrowing driving policy, and the second feedback information is used to indicate that the remaining traffic participants that can receive a signal have received the second lane-borrowing driving policy.

In a possible design, the transceiver unit is configured to receive third feedback information sent by the vehicle, where the third feedback information is used to indicate that the vehicle has completed lane-borrowing driving, and send fourth feedback information to the remaining traffic participants that can receive a signal, where the fourth feedback information is used to indicate, to the remaining traffic participants that can receive a signal, that the vehicle has completed lane-borrowing driving.

In a possible design, the transceiver unit is further configured to receive fifth feedback information sent by the vehicle, where the fifth feedback information is used to indicate that the vehicle has received the first lane-borrowing driving policy, and receive sixth feedback information sent by the vehicle, where the sixth feedback information is used to indicate that the vehicle has completed lane-borrowing driving.

In a possible design, the processing unit is further configured to determine that the vehicle density on a lane of any direction is less than or equal to the preset threshold, and the transceiver unit is further configured to send a second notification message to a traffic participant that can receive a signal in the driving area for lane-borrowing driving, where the second notification message is used to instruct the traffic participant that can receive a signal in the driving area to end lane-borrowing driving.

According to a fourth aspect, a traffic participant is provided, including a transceiver unit configured to receive a first lane-borrowing driving policy sent by a control center, where the first lane-borrowing driving policy includes an instruction for controlling lane-borrowing driving of the traffic participant, and a processing unit configured to obtain a control parameter based on the first lane-borrowing driving policy, driving information of the traffic participant, and road condition information collected by the traffic participant, where the control parameter is used to control lane-borrowing driving of the traffic participant.

In a possible design, the first lane-borrowing driving policy includes at least one of first indication information used to indicate that the vehicle can perform lane-borrowing driving, a driving sequence and speed of the vehicle during lane-borrowing driving, and lane information, the driving information includes at least one of a status, position information, a current speed, and a driving intention of the traffic participant, and the transceiver unit is further configured to send the driving information to the control center.

In a possible design, the transceiver unit is further configured to send the lane-borrowing requirement to the control center, where the lane-borrowing requirement includes position information of the traffic participant, an expected lane-borrowing driving track, and the lane-borrowing driving reason, send first feedback information to the control center, where the first feedback information is used to indicate that the vehicle has received the first lane-borrowing driving policy, and send third feedback information to the control center, where the third feedback information is used to indicate that the traffic participant has completed lane-borrowing driving.

In a possible design, the transceiver unit is further configured to receive a notification message sent by the control center, where the notification message is used to instruct the traffic participant to end lane-borrowing driving.

According to yet another aspect, an embodiment of this application provides a computer storage medium configured to store a computer software instruction used by the foregoing control center and/or traffic participant, where the computer software instruction includes a program designed for performing the foregoing aspects.

According to yet another aspect, an embodiment of this application provides a computer program product including an instruction. When the instruction runs on a computer, the computer performs the methods in the foregoing aspects.

Embodiments of this application provide a lane-borrowing vehicle driving method and a control center. The control center generates the first lane-borrowing driving policy of the vehicle based on the lane-borrowing requirement, the moving trend of the vehicle, and the preset traffic rule, where the lane-borrowing requirement includes the lane-borrowing driving reason, and the first lane-borrowing driving policy includes the instruction for controlling lane-borrowing driving of the vehicle, and the control center sends the first lane-borrowing driving policy to the vehicle. Compared with other approaches in which lane-borrowing driving is performed based on an experienced driver or based on only a given collision warning and reaction and operation of a driver, which is insecure, in this application, the control center may plan a lane-borrowing driving policy in real time, to improve security of lane-borrowing driving.

DESCRIPTION OF EMBODIMENTS

For ease of understanding, example descriptions of some concepts related to this application are provided for reference are shown as follows An ITS is intended to establish, by integrating and using advanced information technologies, communications technologies, sensing technologies, control technologies, computer technologies, and the like, a real-time, accurate, and highly-efficient comprehensive transportation management system that plays an all-round role in a wide range. The ITS can effectively use transportation facilities to reduce traffic load and environmental pollution, ensure traffic safety, and improve transportation efficiency. Development of the ITS is closely linked with development of the Internet of things (IoT), is a reflection of the IoT in a transportation industry, and covers collection, processing, distribution, exchange, analysis, and utilization of various types of information in the transportation system.

Lane-borrowing driving A collective term of a scenario in which a pedestrian goes through a lane when there is no sidewalk, and a vehicle drives into another road when swerving, meeting, overtaking, turning, or parking, including changing a lane of a motor vehicle, driving into a non-motor lane or a sidewalk, and driving into a motorway or a sidewalk of a non-motor vehicle, may be a temporary lane-borrowing, or lane-borrowing performed by a vehicle on a tidal lane, and may be applied to a scenario in which an oncoming lane is borrowed to improve driving efficiency when a plurality of vehicles drive slowly on one side of a road.

A tidal lane is a reversible lane applied to a scenario in which a change of a driving direction is made on a trial basis, based on different morning and evening traffic flows in different time periods, in a specific lane of a road that meets a condition on an urban expressway. For example, a driving direction of a main lane is controlled by changing an indication direction of a lane lamp in order to adjust a quantity of lanes. A left turn lane is very congested, but a straight lane is unblocked. A traffic officer may click a remote control to change the straight lane to the left turn lane, and left turn vehicles are "digested". The lane can change with a traffic flow.

The embodiments of this application may be applied to an ITS, a scenario in which a vehicle needs to drive into an oncoming lane for lane-borrowing driving when there is an obstacle, an unclear vision, or the like, or a scenario in which the vehicle performs lane-borrowing driving when an oncoming lane is borrowed to improve driving efficiency when a plurality of vehicles drive slowly on one side of a road.

Figure 1:
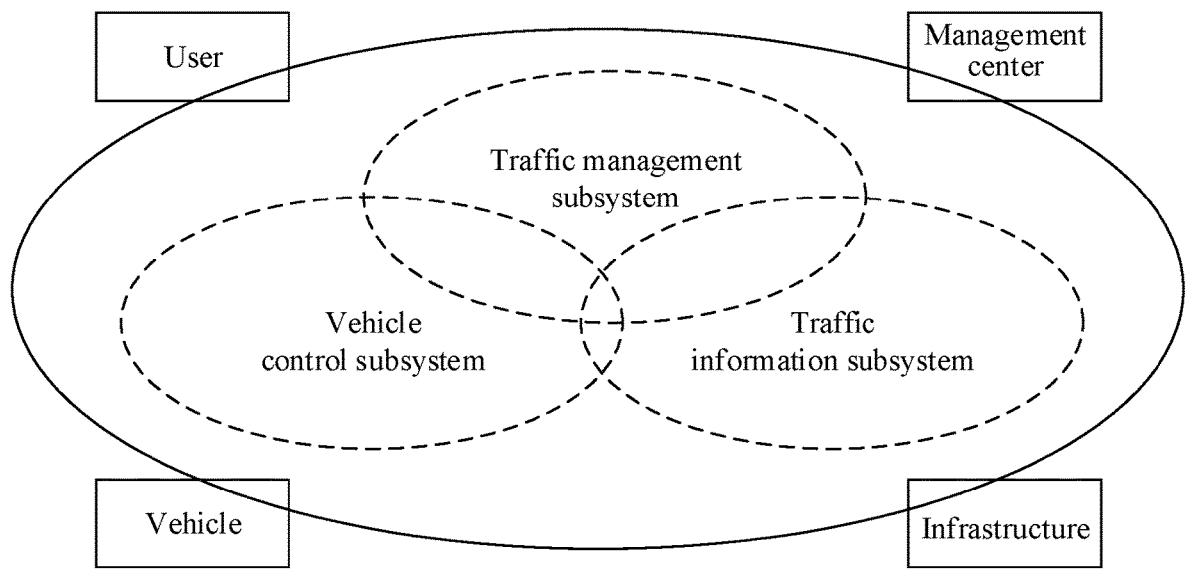
FIG. 1 is a schematic network diagram of an intelligent transportation system (ITS) according to an embodiment of this application.

As shown in FIG. 1, land transportation is used as an example. The ITS includes a vehicle control subsystem, a traffic information subsystem, and a traffic management subsystem. The vehicle control subsystem is mainly deployed in a vehicle, the traffic information subsystem is mainly deployed in an infrastructure, and the traffic management system subsystem is mainly deployed in a management center. The vehicle control subsystem may be responsible for safely and efficiently controlling driving of a vehicle, the traffic information subsystem may be responsible for collecting, storing, processing, and exchanging information about a traffic participant accurately and in time, and the traffic management subsystem may be responsible for coordinating and controlling activities of a traffic participant according to various aspects of traffic information. In this way, a network structure of the ITS may include a vehicle, an infrastructure, a management center, and a user. The user may be a pedestrian, a vehicle user, or the like. The traffic participant in the ITS mainly includes an infrastructure such as a road or a roadside device, a vehicle, a vehicle user, a pedestrian, a management center, and the like. These traffic participants interact with each other based on a communications network.

Figure 2:
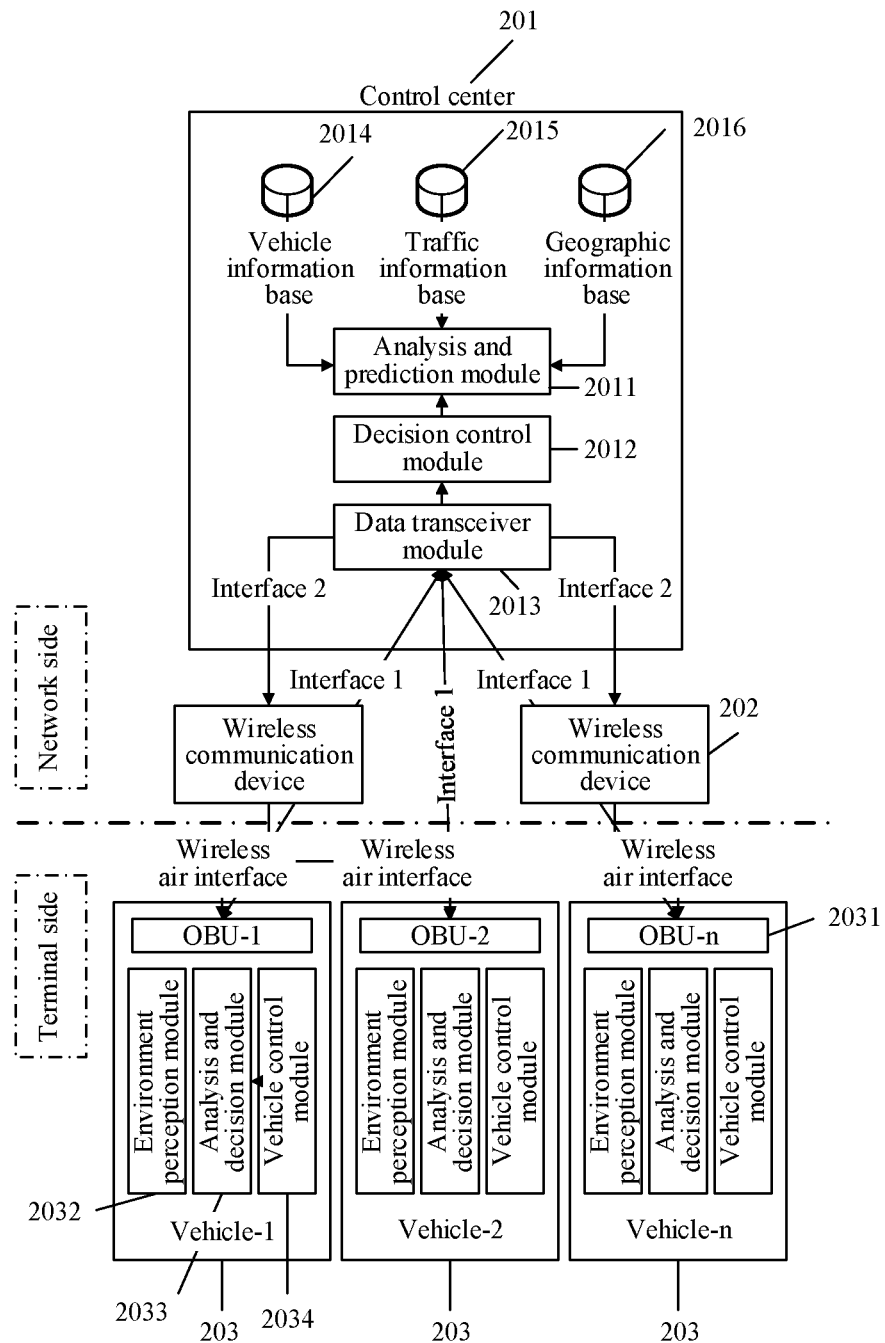
FIG. 2 is a schematic diagram of an intelligent transportation network architecture according to an embodiment of this application.

As shown in FIG. 2, for a network architecture of this application, refer to the ITS, mainly including a network side device and a terminal side device. The network side device includes a transportation control unit (TCU) 201 and a wireless communications device 202. The terminal side device may include a traffic participant 203. The traffic control center 201 is a core component of this application, and may be referred to as a control center 201 for short. The traffic control center 201 is a dedicated device deployed on a network side, and may also be used as a function component of a mobile edge computing (MEC) device, or as a function component of the foregoing management center. This is not limited in this application. The control center 201 is mainly responsible for collecting, storing and analyzing data from a vehicle, a roadside device, or another traffic-related element, generating a dynamic traffic status or a dynamic traffic status diagram, predicting a status change of a traffic participant, determining a potential risk, and further generating a lane-borrowing driving policy. In other words, the control center 201 may perform coordinated control with a traffic participant using a network. The wireless communications device 202 may provide a basic device of a wireless network, for example, a cellular network base station, and support communication between traffic participants, for example, support communication between the control center 201 and a vehicle. The traffic participant 203 in the network architecture of this application mainly refers to an intelligent vehicle, referred to as a vehicle in this embodiment of this application. In other words, the vehicle is a main traffic participant of this application. After receiving a driving policy delivered by the network side, the traffic participant 203 generates a control parameter based on self-environment perception and comprehensive determining of an analysis and decision module, and executes vehicle control in order to complete a lane-borrowing operation, and report related information to the network side in real time.

The control center 201 may include an analysis and prediction module 2011, a decision control module 2012, and a data transceiver module 2013. In this embodiment of this application, the analysis and prediction module 2011 may be configured to analyze various traffic data, and predict a status change and a potential risk of a related traffic participant. The various traffic data may include a vehicle information base 2014, a traffic information base 2015, and a geographic information base 2016. The vehicle information base 2014 stores driving information collected from a traffic participant (mainly a vehicle, also including a motorcycle, a bicycle, and a pedestrian related to the vehicle), including a status, a position, a speed, a driving intention, and the like. The traffic information base 2015 may store traffic information collected from a roadside device or another traffic-related element, including a road condition, a traffic signal, an obstacle, weather, and the like. The geographic information base 2016 may store a high-precision map or the like used for transportation. The decision control module 2012 may be configured to be responsible for generating a lane-borrowing driving policy, and perform coordinated control on a related traffic participant. The data transceiver module 2013 may be configured to be responsible for communication between the control center 201 and another device or module.

The vehicle is a main traffic participant in this application, and is mainly configured to after receiving the lane-borrowing driving policy delivered by the network side, generate a control parameter based on the lane-borrowing driving policy, self-environment perception, and comprehensive determining of an analysis and decision module, and execute vehicle control in order to complete lane-borrowing driving, and report feedback information to the network side after lane-borrowing driving. The vehicle 203 may include an on-board unit (OBU) 2031, an environment perception module 2032, an analysis and decision module 2033, and a vehicle control module 2034. The OBU 2031 may be in a form of a vehicle-mounted device, or may be in a form of a remote telematics box (T-Box) and a smartphone, can be configured to obtain status data such as lane level position data and a vehicle speed, and periodically send the data to the control center 201 using a wireless network, may further be configured to receive risk data, an alarm, an event, a signal light data, and sign data, and prompt a driver using voice, video, and the like, may further be configured to receive the driving policy delivered by a network, and forward the driving policy to the vehicle control module 2034 for automatic driving control. The environment perception module 2032 may store information about a vehicle, a pedestrian, a road object status, and the like that are identified by a roadside sensor and a vehicle-mounted sensor. The roadside sensor and the vehicle-mounted sensor may be a camera, a laser radar, a millimeter wave radar, or the like. Perception data collected by the roadside sensor and the vehicle-mounted sensor may be an originally collected video stream, point cloud data of a radar, or data such as a position, a speed, a steering angle, a size, and the like of an analyzed structured human, vehicle, and object. The original video stream data and the point cloud data of the radar first need to be analyzed as identifiable data such as a position, a speed, a steering angle, a size, and the like of a structured human, vehicle, and object. The analysis and decision module 2033 may be configured to analyze a potential risk near the vehicle based on at least one of information collected by the environment perception module 2032, driving information of the vehicle, and a driving policy delivered by a network side, to generate a final vehicle control parameter. The vehicle control module 2034 is configured to implement automatic control or semi-automatic control of the vehicle based on the vehicle control parameter generated by the analysis and decision module 2033.

The wireless communications device 202 is configured to provide an infrastructure (for example, a cellular network base station) of a wireless network to support communication between traffic participants (for example, the control center and the vehicle).

A communications interface in the network architecture provided in this application is responsible for standardizing interconnection of communications ports between traffic participants in order to implement interconnection and interworking. The communications interface may include an interface 1, an interface 2, and a wireless air interface 3. Serving as an application layer interface for communication between the vehicle and the control center, the interface 1 is used by the vehicle to report status information such as a position and a speed to the control center, and is used by the control center to deliver data such as an alarm and control information to the vehicle. The control center connects the interface 2 to network elements of different networks according to deployment requirements. Different network elements may provide different interfaces, for example, interfaces in a dedicated short range communications (DSRC) technology, a Long Term Evolution (LTE) technology, and a fifth generation (5G) network may be different. By adapting these interfaces, a communication delay, reliability, bandwidth, and the like between traffic participants may be ensured. Serving as an air interface in mobile communication, the wireless air interface 3 may serve as a wireless transmission specification between a wireless communications device (for example, a base station) and a mobile communications device (for example, a vehicle), and defines a usage frequency, bandwidth, an access opportunity, a coding method, and an overshoot handover of a radio channel.

A basic principle of the embodiments of this application may be as follows As a traffic scenario, lane-borrowing driving of the vehicle has the following problems (1) How to ensure safety of the vehicle during lane-borrowing driving, (2) How to ensure that vehicles perform lane-borrowing driving in order. A root cause of these two problems is that, currently, behaviors of related traffic participants cannot be coordinated in a centralized manner based on a self-determining manner of a single vehicle (regardless of a manual driving or self-driving), and this will lead to intention speculation and operation competition between vehicles. Therefore, this application provides a lane-borrowing vehicle driving method such that all related vehicles in a driving area for lane-borrowing driving are coordinated and controlled by the control center using a network. The control center may plan the lane-borrowing driving area based on the lane-borrowing requirement and the moving trend of the traffic participant and with reference to a preset traffic rule, calculate, generate, and deliver the lane-borrowing driving policy in real time, and perform coordinated control on the related traffic participants using the network in order to safely implement lane-borrowing driving of the vehicle in order.

The following further describes the embodiments of this application with reference to a network architecture and principle provided in this application.

Figure 3:
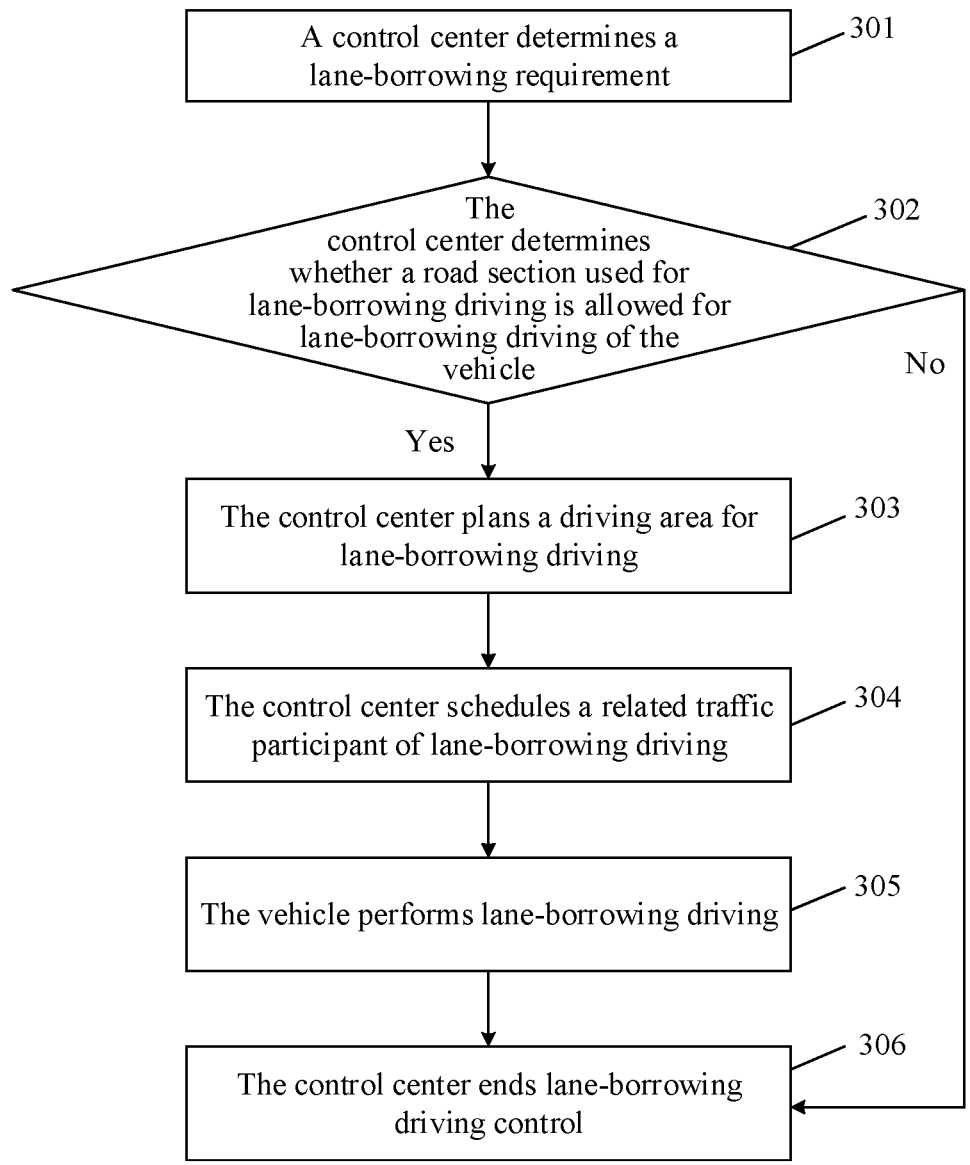
FIG. 3 is a schematic flowchart of a lane-borrowing vehicle driving method according to an embodiment of this application.

An embodiment of this application provides a lane-borrowing vehicle driving method. As shown in FIG. 3, the method includes the following steps.

301. A control center determines a lane-borrowing requirement.

There may be a plurality of trigger conditions for determining the lane-borrowing requirement by the control center. The lane-borrowing requirement may be initiated by a traffic participant (mainly a vehicle), or may be initiated by the control center based on a traffic condition.

For example, when determining, due to a front obstacle, that a lane in an original direction does not meet a lane-changing condition, a vehicle needs to perform lane-borrowing driving on a lane in a reverse direction. In this case, the vehicle may send a lane-borrowing requirement to a wireless communications device through a wireless air interface 3, and the wireless communications device sends the lane-borrowing requirement to the control center through an interface 2. The lane-borrowing requirement may include a lane-borrowing driving reason of the vehicle.

Alternatively, when the control center determines that a vehicle density in a direction exceeds a preset threshold, the control center may initiate a lane-borrowing requirement such that a lane in the direction is used as a tidal lane.

302. The control center determines whether vehicle lane-borrowing driving is allowed in a road section in which lane-borrowing driving needs to be performed, if it is determined that vehicle lane-borrowing driving is allowed, step 303 is performed, or if it is determined that vehicle lane-borrowing driving is not allowed, step 306 is performed.

The control center may determine, using an analysis and prediction module 2011 according to a preset rule stored in a traffic information base 2015, for example, according to a traffic rule and a current road condition, for example, whether an obstacle exists, whether vehicle lane-borrowing driving is allowed.

303. The control center plans a driving area for lane-borrowing driving.

The control center may control the analysis and prediction module 2011 to plan out, based on the lane-borrowing requirement, the driving area for lane-borrowing driving, where the driving area may include a start-stop range, a quantity of lanes, and the like for lane-borrowing driving. For example, the driving area may be a range of 50 m to 100 m ahead of a current position of a vehicle with the lane-borrowing requirement, and the quantity of lanes that may be used for lane-borrowing driving is 1.

304. The control center schedules a related traffic participant of lane-borrowing driving.

The control center may control the analysis and prediction module 2011 to determine the related traffic participant based on map information of the driving area, notify the related traffic participant that lane-borrowing driving is to occur in the driving area, and then control the analysis and prediction module 2011 to generate a dynamic traffic status of the traffic participant in a preset area. The preset area is different from the driving area. A range of the preset area may include a driving area, an area in which a traffic participant that is outside the driving area and that is about to drive into the driving area is located. In this way, the analysis and prediction module 2011 may generate the dynamic traffic status in the preset area, obtain, based on the dynamic traffic status, a moving trend of the traffic participant in a subsequent preset time, and determine whether a collision may occur. In this way, a decision control module 2012 may generate a lane-borrowing driving policy of the vehicle based on the lane-borrowing requirement, a moving area of the vehicle, and a preset traffic rule, where the lane-borrowing driving policy includes an instruction for controlling lane-borrowing driving of the vehicle, for example, a driving sequence instruction, a driving speed instruction, and a driving time instruction, and a collision avoidance instruction of the vehicle, and then control a data transceiver module 2013 to send the lane-borrowing driving policy to the vehicle.

In addition, in a case in which the vehicle independently initiates a temporary lane-borrowing requirement for lane-borrowing driving, the decision control module 2012 may further generate a lane-borrowing driving policy of another traffic participant (mainly a vehicle) in the preset area, which may be different from the lane-borrowing driving policy of a lane-borrowing driving vehicle in order to determine a driving sequence of traffic participants in different directions, and avoid collision. For lane-borrowing driving on the tidal lane, for example, lane-borrowing driving policies received by vehicles on a tidal lane in a driving area may be the same. When a vehicle driving on the tidal lane receives a lane-borrowing driving policy indicating that the vehicle is prohibited from driving, the vehicle needs to be changed to another lane in a same direction. Lane-borrowing driving policies received by vehicles that are about to drive into the tidal lane may be the same. In other words, the lane-borrowing driving policy generated by the decision control module 2012 is mainly used to coordinate the vehicle to drive according to a new road plan.

305. The vehicle performs lane-borrowing driving.

The vehicle may receive the lane-borrowing driving policy using an OBU 2031, collect surrounding road condition information and driving information of the vehicle using an environment perception module 2032. An analysis and decision module 2033 may generate a control parameter according to the lane-borrowing driving policy and the road condition information, where the control parameter is used to control lane-borrowing driving of the vehicle, and send the control parameter to a vehicle control module 2034. The vehicle control module 2034 may implement automatic control or semi-automatic control of the vehicle based on the control parameter.

306. The control center ends lane-borrowing driving control.

A vehicle of temporary lane-borrowing driving may send feedback information to the control center after lane-borrowing driving of the vehicle is completed in order to notify the control center that lane-borrowing driving is completed. The control center can restore monitoring on related traffic devices before lane-borrowing driving. For lane-borrowing driving on the tidal lane, when the control center determines that a vehicle density on a lane in a direction of lane-borrowing driving is less than a preset threshold, the control center may restore a lane status, and notify, in a timely manner, a related traffic participant that the lane status is restored.

In this way, all related vehicles performing lane-borrowing driving in the driving area for lane-borrowing driving are coordinated and controlled by the control center in order to safely implement lane-borrowing driving in order.

Figure 4A:
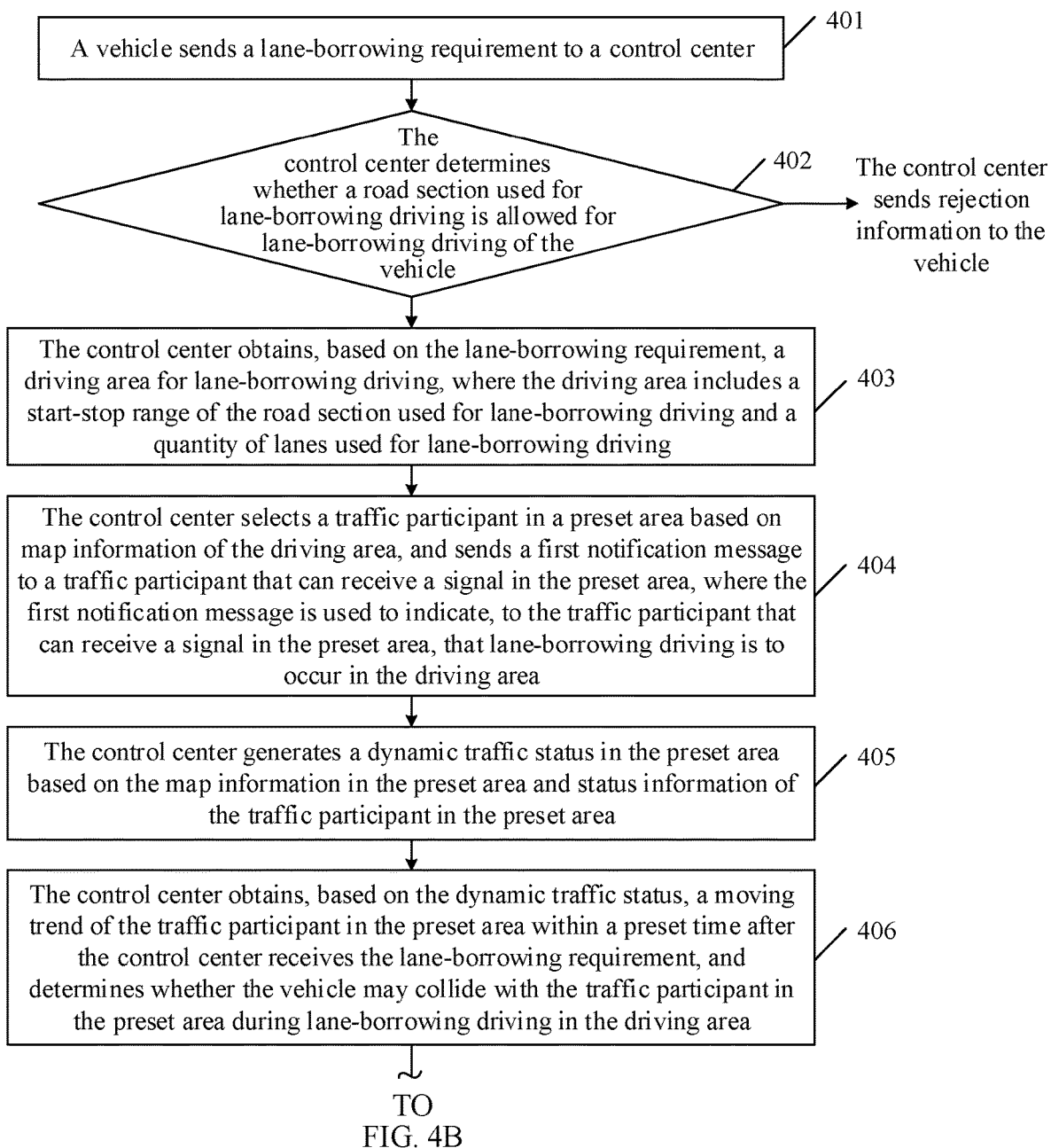
FIG. 4A is a schematic flowchart of a lane-borrowing vehicle driving method according to an embodiment of this application.
Figure 4B:
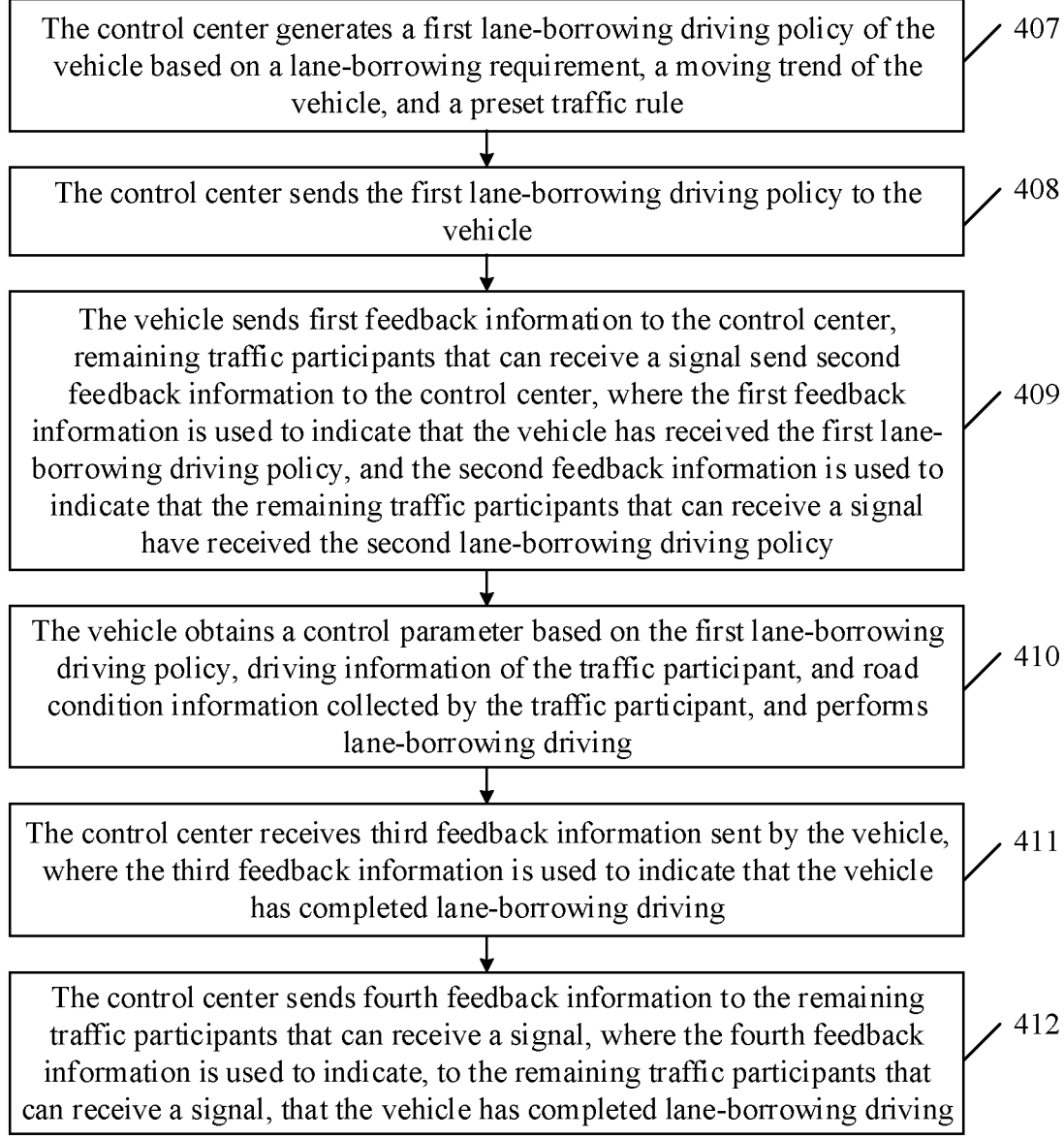
FIG. 4B is another schematic flowchart of a lane-borrowing vehicle driving method according to an embodiment of this application.

The following further describes the foregoing embodiment using temporary lane-borrowing driving. Therefore, an embodiment of this application provides a lane-borrowing vehicle driving method. It is assumed that a vehicle encounters an obstacle when driving on a bidirectional single lane, needs to perform lane-borrowing driving, and no other lane is available in an original lane direction. Vehicles of the two lanes have different right-of-way levels. By default, a vehicle performing lane-borrowing driving needs to give way to a vehicle that drives straight. As shown in FIG. 4A and FIG. 4B, the method includes the following steps.

401. A vehicle sends a lane-borrowing requirement to a control center.

Figure 5:
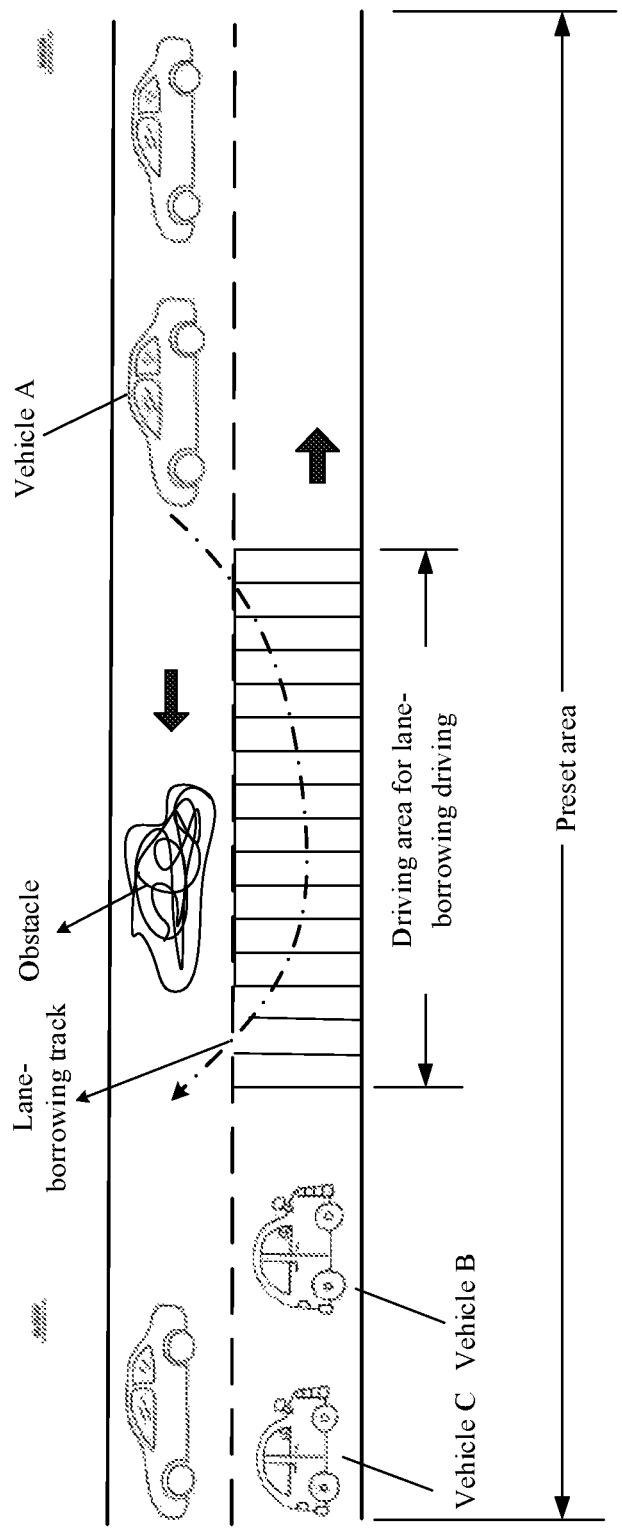
FIG. 5 is a schematic diagram of a temporary lane-borrowing scenario of a vehicle according to an embodiment of this application.

As shown in FIG. 5, when a traffic participant, for example, a vehicle A, detects a front obstacle, and because there is only one lane in an original lane direction, and is currently blocked by the obstacle, the vehicle A determines that the lane in the original direction does not meet a lane-changing condition. Therefore, the vehicle A generates a lane-borrowing driving request and sends the lane-borrowing requirement to the control center.

In a possible design, the lane-borrowing requirement includes position information of the vehicle A, an expected lane-borrowing driving track, and a lane-borrowing driving reason. A global positioning system (GPS) positioning function module of the vehicle A may obtain the position information of the vehicle A. An OBU may generate the lane-borrowing track based on an obstacle obtained by an environment perception module 2032. The lane-borrowing reason may be indication information indicating that an obstacle exists ahead.

402. The control center determines whether lane-borrowing driving of the vehicle is allowed in a road section in which lane-borrowing driving is performed, and if the control center determines that lane-borrowing driving of the vehicle is allowed in the road section in which lane-borrowing driving is performed, step 403 is performed.

When the control center receives, using a data transceiver module 2013, the lane-borrowing requirement sent by the vehicle, an analysis and prediction module 2011 may be configured to determine whether lane-borrowing driving is allowed in the road section in which lane-borrowing driving of the vehicle is performed.

In an example, according to FIG. 5, when the control center receives the lane-borrowing requirement sent by the vehicle A, the control center may first determine, according to a preset traffic regulation stored in a traffic information base 2015 and whether an obstacle exists in the road section in which lane-borrowing driving needs to be performed, whether lane-borrowing driving of the vehicle A is allowed in a road section in which lane-borrowing driving is to be performed, namely, whether the road section meets a condition for lane-borrowing driving. The preset traffic regulation may be a regulation of lane-borrowing driving in the road section according to a traffic regulation, for example, it is regulated that lane-borrowing driving may be performed or may not be performed in the road section. When the preset traffic regulation specifies that lane-borrowing driving may be performed in the road section, and the control center detects that an obstacle exists in the road section in which lane-borrowing driving needs to be performed, the control center determines that lane-borrowing driving of the vehicle A is allowed in the road section, otherwise, the control center sends rejection information to the vehicle A in order to notify the vehicle A that lane-borrowing driving cannot be performed.

403. The control center obtains, based on the lane-borrowing requirement, a driving area for lane-borrowing driving, where the driving area includes a start-stop range of the road section used for lane-borrowing driving and a quantity of lanes used for lane-borrowing driving.

Because the lane-borrowing requirement includes the current position information of the vehicle, the expected lane-borrowing track, the lane-borrowing reason, and the like, the analysis and prediction module 2011 in the control center may be configured to plan, based on the lane-borrowing requirement, map information stored in a geographic information base, and the like, the driving area for lane-borrowing driving. FIG. 5 is used as an example. In the lane-borrowing track and the lane-borrowing reason, the driving area may be a road section range from a current position of the vehicle A to a position 100 meters ahead of the vehicle A. The quantity of lanes used for lane-borrowing driving is 1, namely, a start position of the start-stop range is the current position of the vehicle A, an end position is the position 100 meters ahead of the vehicle A, and the quantity of lanes used for lane-borrowing driving of the vehicle A is 1.

404. The control center selects a traffic participant in a preset area based on map information of the driving area, and sends a first notification message to a traffic participant that can receive a signal in the preset area, where the first notification message is used to indicate, to the traffic participant that can receive a signal in the preset area, that lane-borrowing driving is to occur in the driving area.

After the control center determines the driving area for lane-borrowing driving, to ensure safety of the vehicle performing lane-borrowing driving, and avoid a collision between the vehicle performing lane-borrowing driving and a vehicle that is driving in the driving area or is about to drive into the driving area, the control center may notify, using the data transceiver module 2013, the vehicle that is driving in the driving area or is about to drive into the driving area in order to warn the vehicles that lane-borrowing driving is to occur in the driving area.

FIG. 5 is used as an example. The control center may determine the preset area based on the map information of the driving area, and a range of the preset area may be greater than the driving area. For example, the preset area shown in FIG. 5 includes an area within a distance behind the vehicle A, the foregoing driving area, and an area within a distance beyond a lane-borrowing driving area ahead of the vehicle A. The area includes a vehicle B and a vehicle C. The control center may select a traffic participant in the preset area, for example, a pedestrian, a vehicle (for example, the vehicle B and the vehicle C), and the like in the preset area, and may further select a roadside device, for example, a speed limiting device, a camera device, a traffic light device, a roadside sensor (a geomagnetic field, a RADAR, and the like), and the like. The control center may send the first notification message to a traffic participant that can receive a signal in the preset area. The traffic participant that can receive a signal herein may include a vehicle, a speed limiting device, a camera device, and the like. The first notification message may be used to indicate, to the traffic participant that can receive a signal in the preset area, that lane-borrowing driving is to occur in the driving area. In this case, a vehicle that can receive a signal in the preset area may be warned, the speed limiting device may send a speed limiting prompt to the vehicle, and the camera device may also record a driving process of the vehicle in the preset area.

405. The control center generates a dynamic traffic status in the preset area based on the map information of the preset area and status information of the traffic participant in the preset area.

The map information of the preset area may be provided by a geographic information base 2016 in the control center. The status information of the traffic participant in the preset area includes at least one of movement information of a pedestrian in the preset area, driving information of all vehicles, and traffic information collected by the roadside device. The movement information of the pedestrian in the preset area may be obtained from a traffic information base 2015, and the driving information of the vehicle may be obtained from a vehicle information base 2014.

In a possible design, the control center may receive, using the data transceiver module 2013, driving information sent by at least one vehicle, where the driving information includes at least one of a status, position information, a current speed, and a driving intention of the vehicle. The sending action may be periodic, and the driving information is stored in the vehicle information base 2014. In addition, the control center may further receive, using the data transceiver module 2013, traffic information sent by at least one roadside device, where the traffic information includes at least one of a road condition, a traffic signal, an obstacle, and weather information, and store the traffic information in the traffic information base. It should be noted that when no roadside device is disposed in the preset area, the status information of the traffic participant in the preset area may not include the traffic information of the roadside device.

FIG. 5 is used as an example. The control center may generate, using the analysis and prediction module 2011 based on the map information of the preset area that is obtained from the vehicle information base 2014, the traffic information base 2015, and the geographic information base 2016, and status information of related traffic participants, a dynamic traffic status in the preset area, where the dynamic traffic status may be a displayable dynamic traffic status diagram, or may also be a non-displayable data structure. The dynamic traffic status includes data of statuses of vehicles in the preset area (for example, information such as a vehicle length, a vehicle width, whether the vehicle is an operating vehicle, whether the vehicle is a special vehicle), real-time position information, a real-time speed and a driving intention (for example, a continuous straight driving or a lane-changing ahead), real-time movement information of a pedestrian, namely, real-time position data of a pedestrian, data of whether a road is congested, a traffic signal is a red light, a green light, or a yellow light, data of an obstacle in the preset area, weather information, and the like.

406. The control center obtains, based on the dynamic traffic status, a moving trend of the traffic participant in the preset area within a preset time after the control center receives the lane-borrowing requirement, and determines whether the vehicle may collide with the traffic participant in the preset area during lane-borrowing driving in the driving area.

After the control center obtains the dynamic traffic status in the preset area, based on the dynamic traffic status, the control center may predict, using the decision control module 2012, a moving trend of a related traffic participant in the preset area in a subsequent preset time. The moving trend may be a moving trend in a preset time after the control center receives the lane-borrowing requirement of the vehicle. The moving trend may be understood as a moving track, and the control center determines, based on the moving trend, whether a vehicle that performs lane-borrowing driving in the driving area may collide with the traffic participant in the preset area during lane-borrowing driving.

FIG. 5 is used as an example. It is assumed that the vehicle A needs to perform lane-borrowing driving on a lane in which the vehicle B is located, no traffic light is disposed in the preset area, and a speed is limited to 60 kilometers per hour (km/h). It is assumed that in a process of lane-borrowing driving of the vehicle A, the vehicle B does not reach a driving area for lane-borrowing driving when passing through the current lane at a current speed. In this case, the vehicle A does not collide with the vehicle B driving in an opposite direction during lane-borrowing driving. Alternatively, the vehicle B reaches the driving area in a lane-borrowing driving process of the vehicle A when passing through the current lane at the current speed, and may collide with the vehicle A of lane-borrowing driving.

407. The control center generates a first lane-borrowing driving policy of the vehicle based on a lane-borrowing requirement, a moving trend of the vehicle, and a preset traffic rule.

When the lane-borrowing requirement is initiated by the vehicle, the decision control module 2012 of the control center may generate the first lane-borrowing driving policy of the vehicle performing lane-borrowing driving based on the moving trend of the vehicle performing lane-borrowing driving, a moving trend of a related vehicle in the preset area, and the traffic rule. A moving trend of a pedestrian, and the like in the preset area may also be included in order to prevent the vehicle from colliding with a pedestrian.

The first lane-borrowing driving policy includes an instruction for controlling lane-borrowing driving of the vehicle, for example, may include at least one of first indication information used to indicate that the vehicle can perform lane-borrowing driving, a driving sequence and speed during lane-borrowing driving of the vehicle, and lane information.

FIG. 5 is used as an example. In the preset traffic rule, when lane-borrowing driving is allowed in the preset area, the first indication information indicates that the vehicle A can perform lane-borrowing driving. In a process of lane-borrowing driving of the vehicle A, the vehicle B does not reach the driving area for lane-borrowing driving when passing through the current lane at the current speed, and the vehicle A does not collide with the vehicle B driving in an opposite direction during lane-borrowing driving. In this case, the vehicle A may first pass through the driving area for lane-borrowing driving, and the vehicle B may drive forward at the current speed after the vehicle A completes lane-borrowing driving. If the vehicle B reaches the driving area in the lane-borrowing driving process of the vehicle A when passing through the current lane at the current speed, the vehicle B may collide with the vehicle A of lane-borrowing driving. A driving sequence of the vehicle A during lane-borrowing driving indicates that the vehicle A needs to stop and wait, or reduce a driving speed, and after the vehicle B drives straight and passes through, at the current speed, the driving area in which the vehicle A needs to perform lane-borrowing driving, the vehicle A can perform lane-borrowing driving. Lane information is a lane of lane-borrowing driving.

408. The control center sends the first lane-borrowing driving policy to the vehicle.

The control center may send the first lane-borrowing driving policy to the vehicle performing lane-borrowing driving using the data transceiver module 2013. In addition, the control center may also send a second lane-borrowing driving policy to remaining traffic participants other than the vehicle performing lane-borrowing driving that can receive a signal and that are in traffic participants in the preset area, where the second driving policy includes at least one of second indication information, a driving sequence and speed of the traffic participant, and lane information, and the second indication information is used to indicate, to the traffic participant, that the vehicle is performing lane-borrowing driving.

For example, in FIG. 5, the second indication information in the second lane-borrowing driving policy received by the vehicle B is used to indicate, to the vehicle B, that the vehicle A is performing lane-borrowing driving, a driving sequence and speed of the vehicle B indicate that the vehicle B passes through the driving area for lane-borrowing driving at a current speed, and lane information is a lane in which the vehicle B is currently located. For the vehicle B, the second lane-borrowing driving policy may serve as a warning to the vehicle B.

409. The vehicle sends first feedback information to the control center, the remaining traffic participants that can receive a signal send second feedback information to the control center, where the first feedback information is used to indicate that the vehicle has received the first lane-borrowing driving policy, and the second feedback information is used to indicate that the remaining traffic participants that can receive a signal have received the second lane-borrowing driving policy.

In other words, the control center may receive the feedback information from the vehicle to learn of whether the vehicle receives the instruction correctly.

410. The vehicle obtains a control parameter based on the first lane-borrowing driving policy, driving information of the traffic participant, and road condition information collected by the traffic participant, and performs lane-borrowing driving.

After receiving the first lane-borrowing driving policy, the vehicle may not directly perform lane-borrowing driving based on the first lane-borrowing driving policy, and needs to further obtain the control parameter using the analysis and decision module 2033 based on the driving information of the vehicle that is collected by the environment perception module 2032 and the road condition information. The control parameter is used to control lane-borrowing driving of the vehicle. In an actual environment around the vehicle performing lane-borrowing driving, some cases are not considered by the control center, for example, a pedestrian is passing through the driving area for lane-borrowing driving of the vehicle, and the vehicle may not perform lane-borrowing driving until the pedestrian passes through. In this way, compared with the instruction in the first lane-borrowing driving policy, instruction information that the vehicle needs to wait for five seconds before performing lane-borrowing driving is added to a finally generated control parameter. Then the finally generated control parameter is transmitted to the vehicle control module 2034 to perform vehicle control.

411. The control center receives third feedback information sent by the vehicle, where the third feedback information is used to indicate that the vehicle has completed lane-borrowing driving.

After the vehicle performing lane-borrowing driving completes lane-borrowing driving, and drives into a lane in an original direction of the vehicle, the OBU 2031 module may be controlled to send the third feedback information to a wireless communications device using a wireless air interface. The wireless communications device sends the third feedback information to the control center using an interface 2, and the control center may learn of that the vehicle performing lane-borrowing driving has executed the lane-borrowing driving policy.

412. The control center sends fourth feedback information to the remaining traffic participants that can receive a signal, where the fourth feedback information is used to indicate, to the remaining traffic participants that can receive a signal, that the vehicle has completed lane-borrowing driving.

The fourth feedback information may be used to enable the remaining traffic participants that can receive a signal to learn of, in time, that the vehicle performing lane-borrowing driving has completed lane-borrowing driving. For example, in the preset area of FIG. 5, if the second driving policy received by the vehicle B and the vehicle C behind the vehicle B is used to instruct the vehicle B and the vehicle C to reduce a driving speed, when learning of that the vehicle A of lane-borrowing driving has completed lane-borrowing driving, the vehicle B and the vehicle C behind the vehicle B may continue to drive at a speed before speed reducing. In other words, the control center will restore a lane status in the driving area for lane-borrowing driving, and end lane-borrowing driving control.

It may be understood that the foregoing lane-borrowing driving method process is a dynamic real-time interaction process. If the vehicle B in FIG. 5 suddenly fails to continue driving, the control center may adjust the first driving policy and the second driving policy in real time, for example, the vehicle B is adjusted to stop immediately, and the vehicle A obtains a driving priority to perform lane-borrowing driving.

In this method embodiment, all related vehicles of temporary lane-borrowing driving are coordinated and controlled by the control center using a network in order to safely implement lane-borrowing driving in order.

Figure 6A:
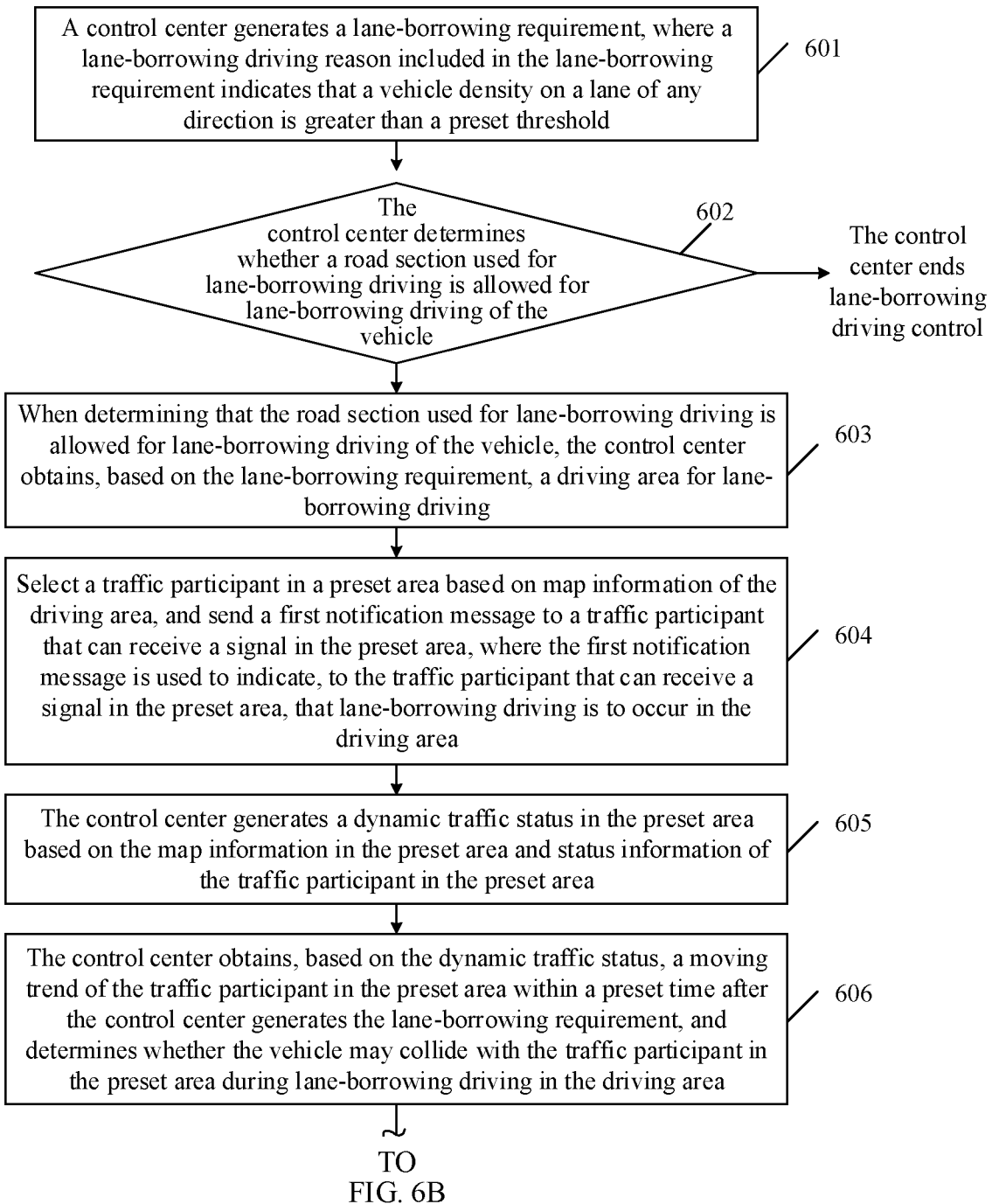
FIG. 6A is a schematic flowchart of a lane-borrowing vehicle driving method according to an embodiment of this application.
Figure 6B:
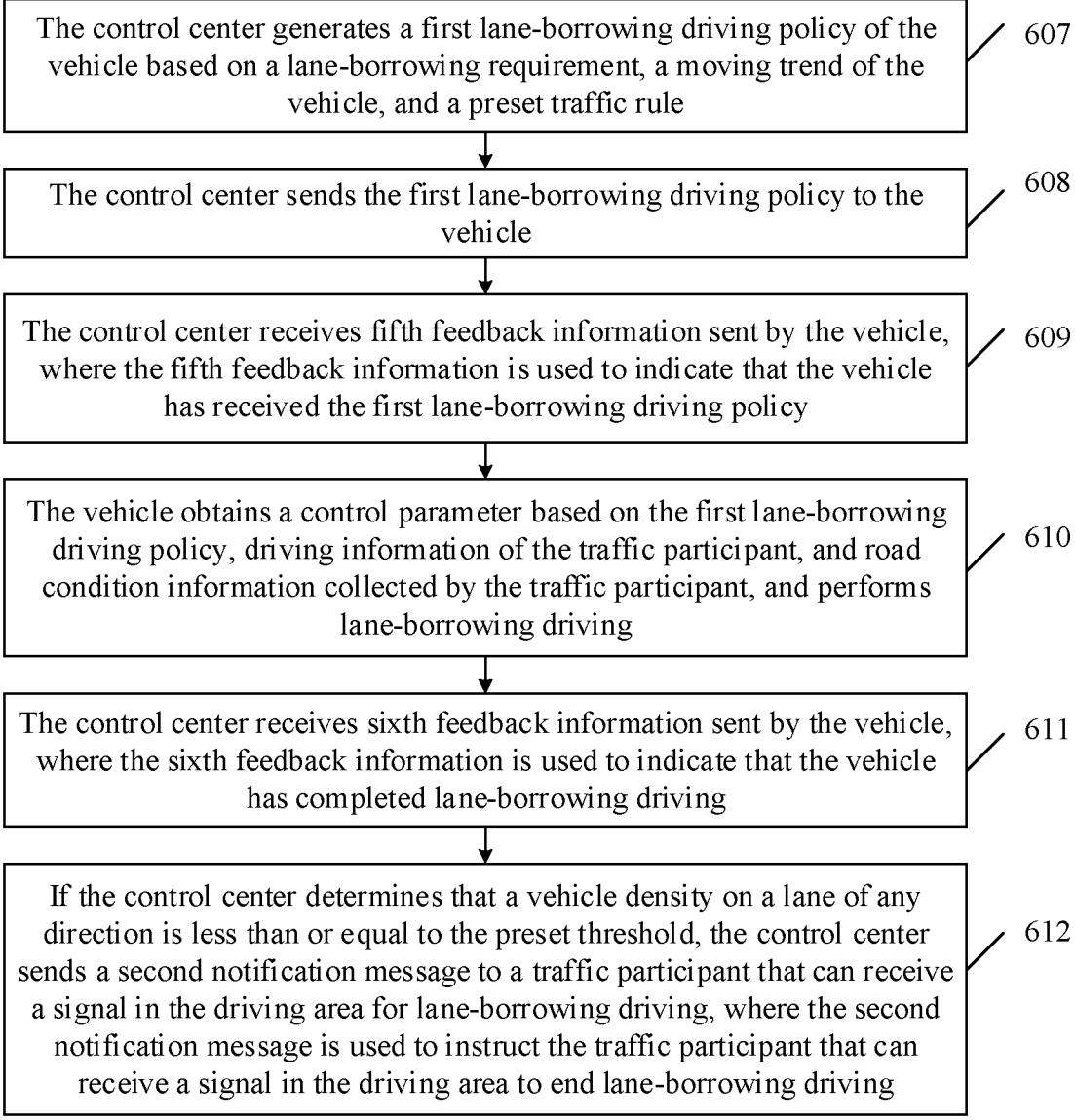
FIG. 6B is another schematic flowchart of a lane-borrowing vehicle driving method according to an embodiment of this application.

In the following, a scenario in which an oncoming lane is borrowed to improve driving efficiency when a plurality of vehicles drive slowly on one side of a road, namely, a tidal lane, is used as an example for description. In the scenario, different from temporary lane-borrowing, a reason for triggering lane-borrowing driving is not an obstacle or the like, but centralized control of the control center. Not the vehicle, but guidance information of the control center that initiates lane-borrowing driving. During an effective period of the tidal lane, the tidal lane is exclusively occupied by a vehicle driving in a reverse direction, and during a failure period of the tidal lane, the tidal lane is exclusively occupied by a vehicle driving in a forward direction. Therefore, in the scenario, an embodiment of this application provides a lane-borrowing vehicle driving method. As shown in FIG. 6A and FIG. 6B, the method includes the following steps.

601. The control center generates the lane-borrowing requirement, where the lane-borrowing driving reason included in the lane-borrowing requirement indicates that a vehicle density on a lane of any direction is greater than the preset threshold.

Figure 7:
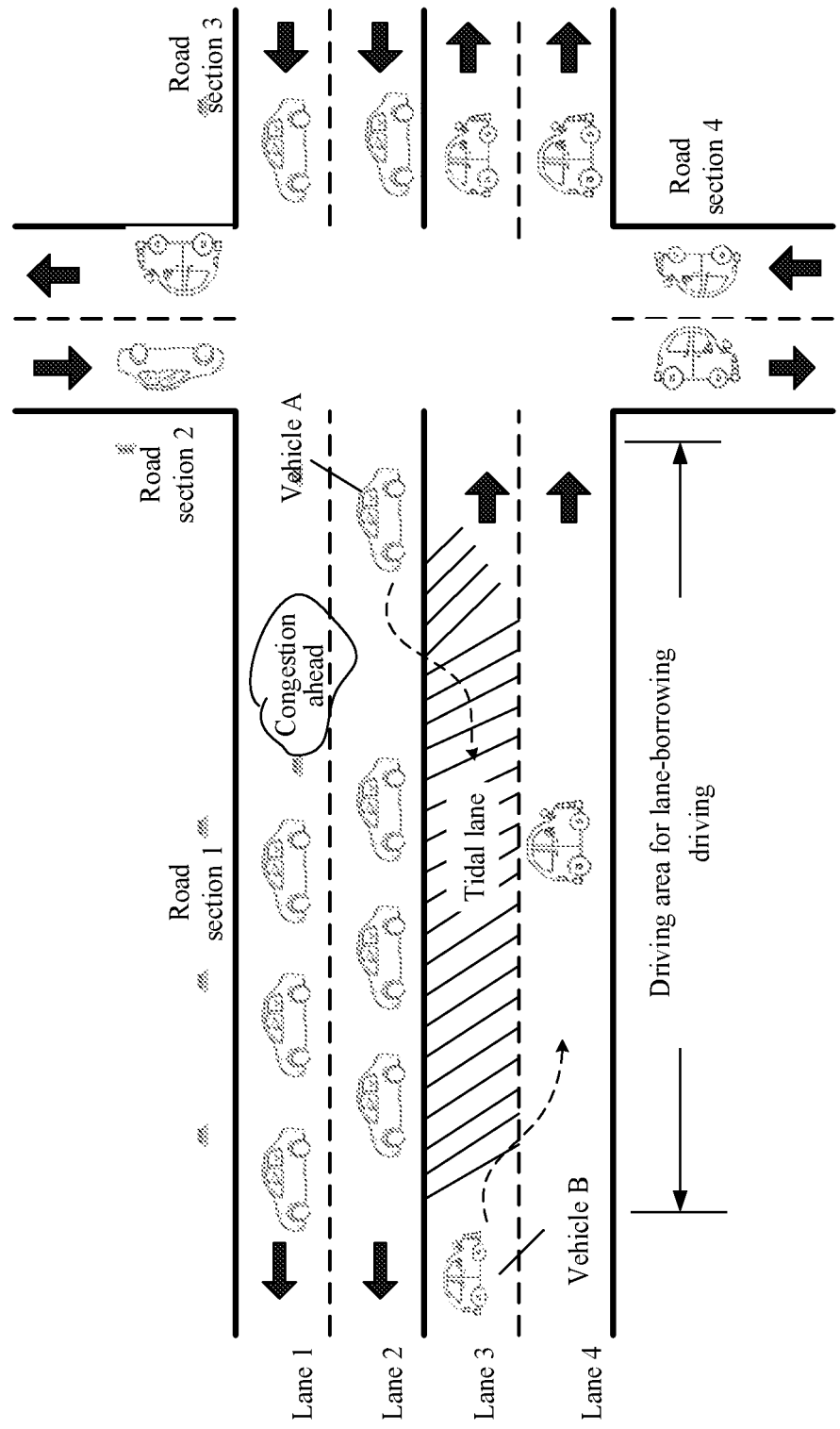
FIG. 7 is a schematic diagram of a vehicle lane-borrowing driving scenario on a tidal lane according to an embodiment of this application.

For the tidal lane, the control center may determine, using the analysis and prediction module 2011, that when lane-borrowing driving needs to be performed in the tidal lane, a trigger condition may be that the analysis and prediction module 2011 determines, based on driving information sent by the vehicle that is stored in the vehicle information base 2014, that a vehicle density on the lane opposite to the tidal lane in direction is relatively large. For example, as shown in FIG. 7, there are four lanes in a road section 1, including a lane 1, a lane 2, a lane 3, and a lane 4. A vehicle driving direction on the lane 1 is consistent with that on the lane 2, a vehicle driving direction on the lane 3 is consistent with that on the lane 4, and the vehicle driving direction on the lane 2 is opposite to that on the lane 3, where the lane 3 is the tidal lane. In a commuter time, a vehicle density on the lane 1 and a vehicle density on the lane 2 are greater than a preset threshold, and congestion easily occurs, and a vehicle density on the lane 3 and a vehicle density on the lane 4 are relatively small, and are less than another preset threshold. In this case, the control center may generate a lane-borrowing requirement such that some of vehicles on the lane 3 can keep a driving direction unchanged on the tidal lane, and continue driving. In this way, the lane 3 can share vehicle density pressures on the lane 1 and the lane 2.

602. The control center determines whether a road section used for lane-borrowing driving is allowed for lane-borrowing driving of the vehicle.

When the control center determines to perform lane-borrowing driving, the analysis and prediction module 2011 may first be used to determine, according to a preset traffic rule stored in the traffic information base 2015 and a road condition of a road section in which lane-borrowing driving needs to be performed, whether lane-borrowing driving can be performed. For example, there is the tidal lane in the road section in which lane-borrowing driving needs to be performed, in the preset traffic rule, lane-borrowing driving is currently allowed to be performed on the tidal lane, and there is no obstacle or a traffic accident in the road section in which lane-borrowing driving needs to be performed. In this case, the control center may determine that lane-borrowing driving of the vehicle is allowed to be performed in the road section used for lane-borrowing driving. If there is an obstacle, a traffic accident, or the like on the tidal lane, the control center may determine that lane-borrowing driving of the vehicle is not allowed to be performed in the tidal lane used for lane-borrowing driving, and the control center ends lane-borrowing driving control.

603. When determining that the road section used for lane-borrowing driving is allowed for lane-borrowing driving of the vehicle, the control center obtains, based on the lane-borrowing requirement, the driving area for lane-borrowing driving.

The driving area may include a start-stop range of the road section used for lane-borrowing driving and a quantity of lanes used for lane-borrowing driving.

For example, in FIG. 7, when the lane-borrowing driving reason included in the lane-borrowing requirement indicates that a vehicle density on a lane of any direction is greater than a preset threshold, the start-stop range of lane-borrowing driving may be shown in a shaded part in FIG. 7, and is a part of road section on the lane 3. A vehicle that drives into the lane 2 or is driving on the lane 2 may drive into a driving area for lane-borrowing driving to perform lane-borrowing driving. The start-stop range of lane-borrowing driving may be preset for the tidal lane, namely, the lane 3. The quantity of lanes used for lane-borrowing driving may be 1, namely, the lane 3. This step may be performed using the analysis and prediction module 2011 of the control center.

604. Select a traffic participant in a preset area based on map information of the driving area, and send a first notification message to a traffic participant that can receive a signal in the preset area, where the first notification message is used to indicate, to the traffic participant that can receive a signal in the preset area, that lane-borrowing driving is to occur in the driving area.

In a scenario in which lane-borrowing driving is performed on the tidal lane, in addition to sending the lane-borrowing driving policy to a vehicle that can perform lane-borrowing driving, a vehicle that is about to drive into a road section of lane-borrowing driving may be notified in advance. Certainly, to save signaling overheads, some vehicles in the road section that do not affect lane-borrowing driving may also not need to receive a notification.

For example, FIG. 7 is used as an example, the analysis and prediction module 2011 in the control center may first select a preset area based on map information that is of the driving area and that is stored in the geographic information base, where a range of the preset area may be greater than a range of the driving area for lane-borrowing driving. For example, there is a crossroad near the tidal lane, and the preset area may include the driving area for lane-borrowing driving, and may further include a part of area of a road section 2 in which a vehicle that is about to drive into the driving area is located, a part of area of a road section 3, and a part of area of a road section 4. In this way, the analysis and prediction module 2011 may select a traffic participant that can perform lane-borrowing driving in a road section 1, mainly vehicles on the lane 1 and the lane 2, further including vehicles on the lane 3, vehicles that are about to drive into the lane 1 in a part of area of the road section 2, vehicles that are about to drive into the lane 2 in a part of area of the road section 3, and vehicles that are about to drive into the lane 2 in the road section 4. Similarly, some vehicles that are about to drive into the lane 3 and the lane 4 in another road section are also included. In this way, the selected vehicles may obtain, in advance using the first notification message, a warning that lane-borrowing driving is to occur in the driving area. The lane 4 of the road section 1 may be not included in the preset area. In other words, a vehicle on the lane 4 may not receive the first notification message.

605. The control center generates a dynamic traffic status in the preset area based on the map information of the preset area and status information of the traffic participant in the preset area.

For implementation of the step, refer to step 405. Details are not described herein again.

Similarly, the control center may receive the driving information periodically sent by at least one vehicle, where the driving information includes at least one of a status, position information, a current speed, and a driving intention of the vehicle, and receives the traffic information periodically sent by at least one roadside device, where the traffic information includes at least one of a road condition, a traffic signal, an obstacle, and weather information.

606. The control center obtains, based on the dynamic traffic status, a moving trend of the traffic participant in the preset area within a preset time after the control center generates the lane-borrowing requirement, and determines whether the vehicle may collide with the traffic participant in the preset area during lane-borrowing driving in the driving area.

During lane-borrowing driving, some vehicles on a lane of a high vehicle dense may drive into a tidal lane in an opposite direction to continue to drive, and a vehicle that originally drives on the tidal lane in a forward direction needs to drive into a neighboring lane in the same direction. Some vehicles on a lane of a high vehicle dense (for example, the lane 2) may collide with a vehicle that drives on the tidal lane (for example, the lane 3) in a forward direction, and the vehicle that drives on the tidal lane (for example, the lane 3) in a forward direction may collide with a vehicle on a neighboring lane (for example, the lane 4). Therefore, the control center may determine, based on the dynamic traffic status in the preset area, a moving trend of a vehicle in a preset time after determining that lane-borrowing driving needs to be performed, to determine whether the vehicle will collide with another vehicle in the driving area during lane-borrowing driving. The step may be performed by the analysis and prediction module 2011.

607. The control center generates a first lane-borrowing driving policy of the vehicle based on a lane-borrowing requirement, a moving trend of the vehicle, and a preset traffic rule.

To avoid the foregoing collision, the control center needs to determine information such as a driving sequence, a speed, and a lane of a related vehicle during lane-borrowing driving. The step may be performed by the decision control module 2012.

In an example, as shown in FIG. 7, the control center may generate, according to a lane-borrowing reason that a vehicle density on the lane 1 or the lane 2 is greater than a preset threshold, and a moving area of the vehicle and the preset traffic rule, a first lane-borrowing driving policy of vehicles on the lane 1, the lane 2, and the lane 3 in the driving area in which lane-borrowing driving needs to be performed, where the first lane-borrowing driving policy includes at least one of first indication information that is used to indicate that the vehicle can perform lane-borrowing driving, a driving sequence and speed of the vehicle during lane-borrowing driving, and lane information. For example, according to the first lane-borrowing driving policy, the vehicle B on the lane 3 in the driving area for lane-borrowing driving may first drive into the lane 4, and a vehicle on the lane 1 and/or the lane 2 in the driving area for lane-borrowing driving, for example, the vehicle A, drives into the lane 3 again, and a speed during lane-borrowing or lane-changing may be given.

608. The control center sends the first lane-borrowing driving policy to the vehicle.

The vehicle that receives the first lane-borrowing driving policy may be a related vehicle in the driving area for lane-borrowing driving, for example, vehicles on the lane 1, the lane 2, and the lane 3 in the driving area for lane-borrowing driving in FIG. 7. The step may be performed by the data transceiver module 2013.

In addition, the control center may also send a second lane-borrowing driving policy to remaining traffic participants other than the vehicle performing lane-borrowing driving that can receive a signal and that are in traffic participants in the preset area, where the second driving policy includes at least one of second indication information, a driving sequence and speed of the traffic participant, and lane information, and the second indication information is used to indicate, to the traffic participant, that the vehicle is performing lane-borrowing driving. For example, in FIG. 7, the control center may further send the second lane-borrowing driving policy to a vehicle that is other than a vehicle in the driving area for lane-borrowing driving and that is in the preset area, for example, a vehicle that is in the road section 2, the road section 3, and the road section 4 and that is about to drive into the lane 1 and the lane 2 such that a vehicle that is about to drive into the lane 1 and the lane 2 may learn of, in advance, that the tidal lane of the lane 3 is performing lane-borrowing driving. Similarly, the second lane-borrowing driving policy may also be sent to a vehicle that is about to drive into the lane 3 and the lane 4.

609. The control center receives fifth feedback information sent by the vehicle, where the fifth feedback information is used to indicate that the vehicle has received the first lane-borrowing driving policy.

The fifth feedback information may enable the control center to learn of that the vehicle has correctly received the first lane-borrowing driving policy. The step may be performed by the data transceiver module 2013.

610. The vehicle obtains a control parameter based on the first lane-borrowing driving policy, driving information of the traffic participant, and road condition information collected by the traffic participant, and performs lane-borrowing driving.

For implementation of the step, refer to step 410. Details are not described herein again.

611. The control center receives sixth feedback information sent by the vehicle, where the sixth feedback information is used to indicate that the vehicle has completed lane-borrowing driving.

612. If the control center determines that a vehicle density on a lane of any direction is less than or equal to the preset threshold, the control center sends a second notification message to a traffic participant that can receive a signal in the driving area for lane-borrowing driving, where the second notification message is used to instruct the traffic participant that can receive a signal in the driving area to end lane-borrowing driving.

In a scenario in which lane-borrowing driving is performed on the tidal lane, the control center may monitor, in real time, a traffic status in the driving area for lane-borrowing driving. When a condition for initiating lane-borrowing driving disappears, for example, on a lane in which a previous vehicle density in a direction is greater than the preset threshold, a vehicle density is less than or equal to the preset threshold or less than another preset threshold, the control center may notify, in time, a vehicle that is driving in the driving area for lane-borrowing driving and a vehicle that is about to drive into the driving area for lane-borrowing driving, that the tidal lane recovers to a normal driving direction. As shown in FIG. 7, a vehicle that is driving on the lane 3 and the lane 4 in the driving area for lane-borrowing driving may be notified that lane-borrowing driving is ended, and a vehicle that is about to drive into the lane 3 and the lane 4 may further be notified that lane-borrowing driving is ended. The control center ends lane-borrowing driving control.

In this way, in a scenario in which lane-borrowing driving needs to be performed on the tidal lane, the control center can perform same coordinated control on related vehicles in order to safely implement lane-borrowing driving in order.

The foregoing mainly describes the solutions provided in the embodiments of this application from a perspective of interaction between network elements. It may be understood that, to implement the foregoing functions, each network element such as the control center and the traffic participant (mainly the vehicle), includes a corresponding hardware structure and/or software module for performing each function. A person skilled in the art should be easily aware that, the example units, algorithms, and steps described with reference to the embodiments disclosed in this specification can be implemented in this application using hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the control center and the traffic participant (mainly a vehicle) may be divided into functional modules based on the foregoing method examples. For example, each functional module may be obtained through division for a corresponding function, or two or more functions may be integrated into one processing module. The integrated module may be implemented in a form of hardware, or may be implemented in a form of a software functional module. It should be noted that, in this embodiment of this application, module division is an example, and is merely a logical function division. In actual implementation, another division manner may be used.

Figure 8:
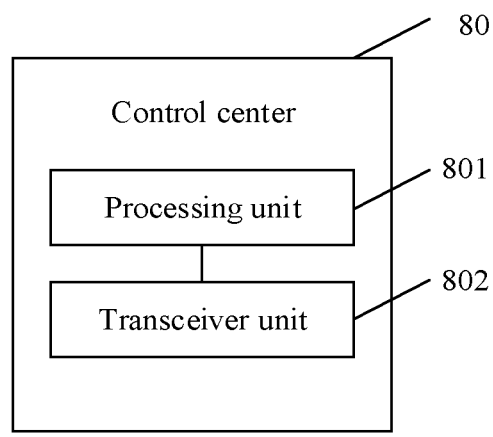
FIG. 8 is a schematic structural diagram of a control center according to an embodiment of this application.

When each function module is obtained through division for each corresponding function, FIG. 8 is a possible schematic structural diagram of the control center used in the foregoing embodiment. The control center 80 includes a processing unit 801 and a transceiver unit 802. The processing unit 801 is configured to support the control center in performing step 301, step 302, step 303, step 304, and step 306 in FIG. 3, step 402, step 403, step 405, step 406, and step 407 in FIG. 4A and FIG. 4B, and step 601, step 602, step 603, step 605, step 606, and step 607 in FIG. 6A and FIG. 6B. The transceiver unit 802 is configured to support the control center in performing step 404, step 408, step 411, and step 412 in FIG. 4A and FIG. 4B, and step 604, step 608, step 609, step 611, and step 612 in FIG. 6A and FIG. 6B. All content related to the steps in the foregoing method embodiments may be cited in function descriptions of corresponding function modules. Details are not described herein.

Figure 9:
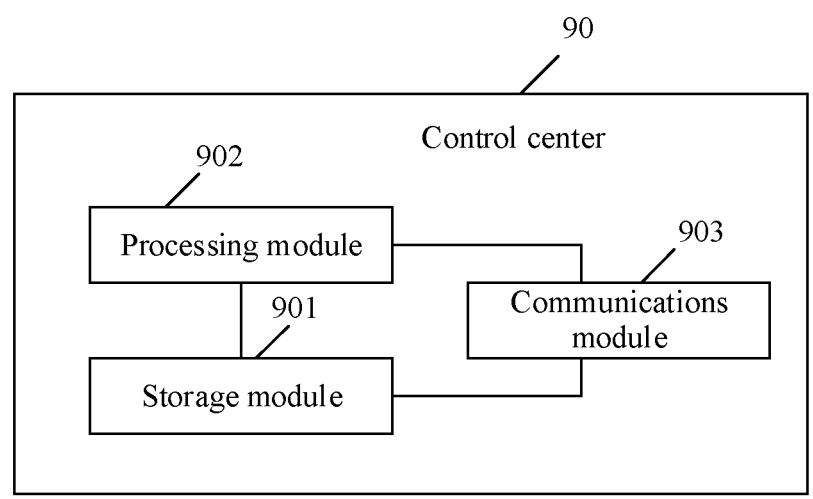
FIG. 9 is a schematic structural diagram of a control center according to an embodiment of this application.

When an integrated unit is used, FIG. 9 is a possible schematic structural diagram of the control center in the foregoing embodiment. The control center 90 includes a processing module 902 and a communications module 903. The processing module 902 is configured to perform control management on actions of the control center. For example, the processing module 902 is configured to support the control center in performing step 301, step 302, step 303, step 304, and step 306 in FIG. 3, step 402, step 403, step 405, step 406, and step 407 in FIG. 4A and FIG. 4B, step 601, step 602, step 603, step 605, step 606, and step 607 in FIG. 6A and FIG. 6B, and/or another step of the technology described in this specification. The communications module 903 is configured to support the control center in communicating with other network entities, for example, communicating with the function module or the network entity shown in FIG. 2. The control center may further include a storage module 901 configured to store program code and data of the control center.

The processing module 902 may be a processor or a controller, such as a central processing unit (CPU), a general-purpose processor, a digital signal processor (DSP), an application-specific integrated circuit (ASIC), a field-programmable gate array (FPGA), or another programmable logical device, a transistor logical device, a hardware component, or a combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The communications module 903 may be a transceiver, a transceiver circuit, a communications interface, or the like. The storage module 901 may be a memory.

Figure 10:
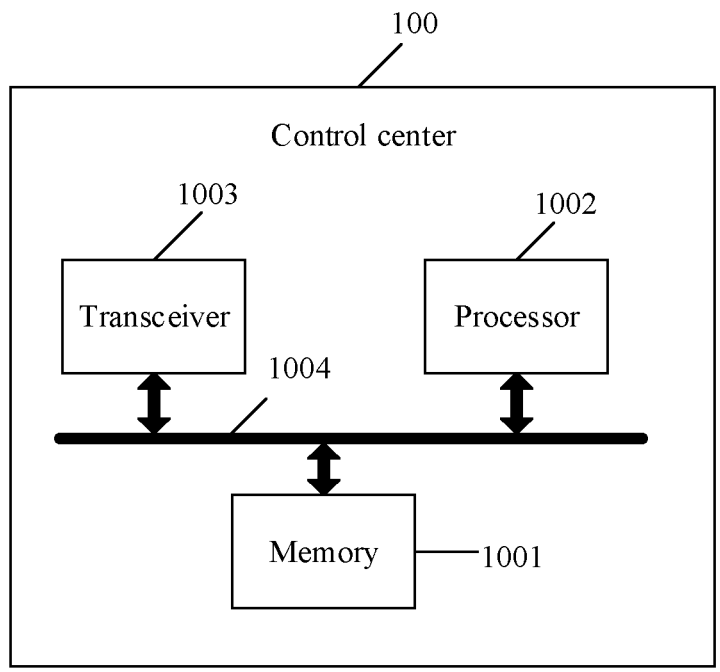
FIG. 10 is a schematic structural diagram of a control center according to an embodiment of this application.

When the processing module 902 is a processor, the communications module 903 is a transceiver, and the storage module 901 is a memory, the control center in this embodiment of this application may be the control center shown in FIG. 10.

Referring to FIG. 10, the control center 100 includes a processor 1002, a transceiver 1003, a memory 1001, and a bus 1004. The transceiver 1003, the processor 1002, and the memory 1001 are connected to each other through the bus 1004. The bus 1004 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 10, but this does not mean that there is only one bus or only one type of bus.

Figure 11:
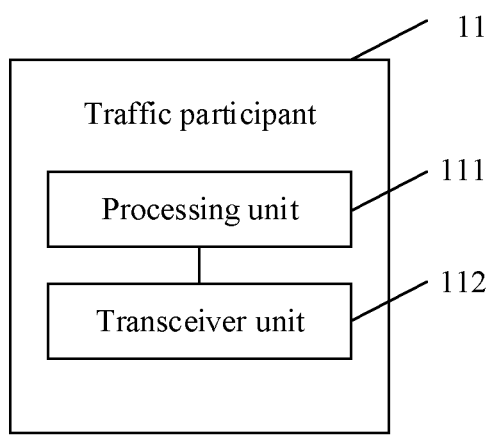
FIG. 11 is a schematic structural diagram of a traffic participant according to an embodiment of this application.

When function modules are divided based on corresponding functions, FIG. 11 shows a traffic participant in the foregoing embodiment, for example, a possible schematic structural diagram of a vehicle. For example, the traffic participant is a vehicle, and the traffic participant 11 includes a processing unit 111 and a transceiver unit 112. The processing unit 111 is configured to support the traffic participant in performing step 305 in FIG. 3, step 410 in FIG. 4B, and step 610 in FIG. 6B. The transceiver unit 112 is configured to support the traffic participant in performing step 401 and step 409 in FIG. 4A and FIG. 4B. All content related to the steps in the foregoing method embodiments may be cited in function descriptions of corresponding function modules. Details are not described herein.

Figure 12:
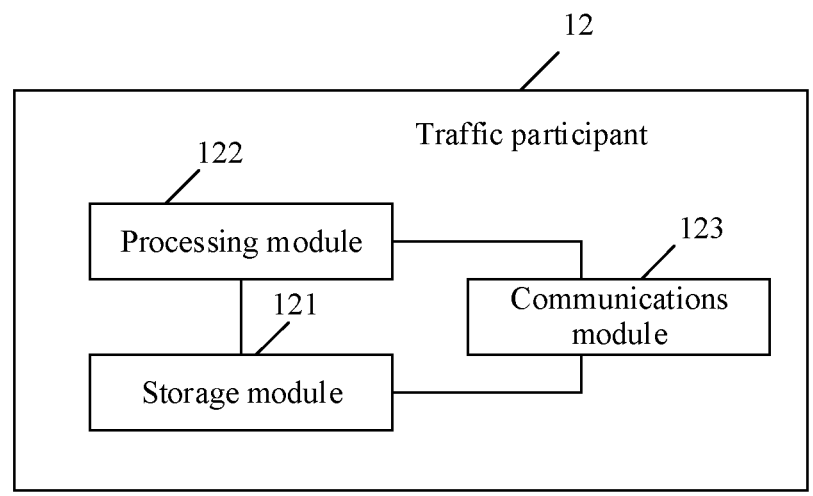
FIG. 12 is a schematic structural diagram of a traffic participant according to an embodiment of this application.

When an integrated unit is used, FIG. 12 is a possible schematic structural diagram of the traffic participant in the foregoing embodiment. When the traffic participant is a vehicle, the traffic participant 12 includes a processing module 122 and a communications module 123. The processing module 122 is configured to perform control management on actions of the traffic participant. For example, the processing module 122 is configured to support the traffic participant in performing step 305 in FIG. 3, step 410 in FIG. 4B, step 610 in FIG. 6B, and/or another step of the technology described in this specification. The communications module 123 is configured to support the traffic participant in communicating with another network entity, for example, communicating with the functional module or the network entity shown in FIG. 2. The traffic participant may further include a storage module 121 configured to store program code and data of the traffic participant.

The processing module 122 may be a processor or a controller, for example, may be a CPU, a general purpose processor, a DSP, an ASIC, an FPGA, or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The communications module 123 may be a transceiver, a transceiver circuit, a communications interface, or the like. The storage module 121 may be a memory.

When the processing module 122 is a processor, the communications module 123 is a transceiver. When the storage module 121 is a memory, the traffic participant in this embodiment of this application may be the traffic participant shown in FIG. 13.

Figure 13:
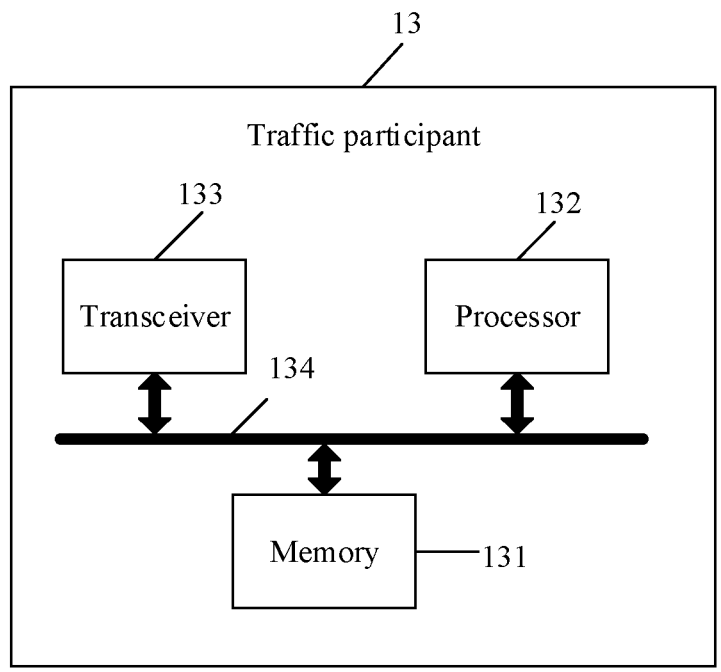
FIG. 13 is a schematic structural diagram of a traffic participant according to an embodiment of this application.

Referring to FIG. 13, the traffic participant 13 includes a processor 132, a transceiver 133, a memory 131, and a bus 134. The transceiver 133, the processor 132, and the memory 131 are interconnected through the bus 134. The bus 134 may be a PCI bus, an EISA bus, or the like. The bus may be classified into an address bus, a data bus, a control bus, and the like. For ease of representation, only one thick line is used to represent the bus in FIG. 13, but this does not mean that there is only one bus or only one type of bus.

Method or algorithm steps described in combination with the content disclosed in this application may be implemented by hardware, or may be implemented by a processor by executing a software instruction. The software instruction may include a corresponding software module. The software module may be stored in a random-access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor such that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

A person skilled in the art should be aware that in the foregoing one or more examples, functions described in this application may be implemented by hardware, software, firmware, or any combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The foregoing descriptions are merely specific implementations of the present disclosure, but are not intended to limit the protection scope of the present disclosure. Any variation or replacement within the technical scope disclosed in the present disclosure shall fall within the protection scope of the present disclosure. Therefore, the protection scope of the present disclosure shall be subject to the protection scope of the claims.

What is claimed is:

1. A lane-borrowing vehicle driving method implemented by a control center, wherein the lane-borrowing vehicle driving method comprises:
   determining that a lane changing condition is not satisfied;
   responsive to the lane changing condition not being satisfied, generating a first lane-borrowing driving policy of a vehicle based on a lane-borrowing requirement, a moving trend of the vehicle, and a preset traffic rule, wherein the lane-borrowing requirement comprises a lane-borrowing driving reason, and wherein the first lane-borrowing driving policy comprises an instruction for controlling lane-borrowing driving of the vehicle; and
   sending the first lane-borrowing driving policy to the vehicle.

2. The lane-borrowing vehicle driving method of claim 1, wherein before generating the first lane-borrowing driving policy, the method further comprises:
   receiving the lane-borrowing requirement from the vehicle, wherein the lane-borrowing requirement comprises position information of the vehicle, an expected lane-borrowing driving track, and the lane-borrowing driving reason; or generating the lane-borrowing requirement, wherein the lane-borrowing driving reason indicates that a vehicle density on a lane of any direction is greater than a preset threshold.

3. The lane-borrowing vehicle driving method of claim 2, further comprising:

determining whether a road section used for the lane-borrowing driving is allowed for lane-borrowing driving;

obtaining a driving area for the lane-borrowing driving based on the lane-borrowing requirement when the road section is allowed for the lane-borrowing driving, wherein the driving area comprises a start-stop range of the road section and a quantity of lanes used for the lane-borrowing driving;

selecting a traffic participant in a preset area based on map information of the driving area;

sending a first notification message to the traffic participant that is permitted to receive a signal in the preset area, wherein the first notification message indicates that the lane-borrowing driving is to occur in the driving area;

generating a dynamic traffic status in the preset area based on map information of the preset area and status information of the traffic participant in the preset area, wherein the status information comprises at least one of movement information of a pedestrian in the preset area, driving information of all vehicles, or traffic information collected by a roadside device;

obtaining a moving trend of the traffic participant in the preset area within a preset time after the lane-borrowing requirement is determined based on the dynamic traffic status;

determining whether the vehicle may collide with the traffic participant in the preset area during the lane-borrowing driving in the driving area; and further generating the first lane-borrowing driving policy based on the moving trend of the traffic participant in the preset area within the preset time after the lane-borrowing requirement is received, wherein the moving trend of the traffic participant in the preset area comprises the moving trend of the vehicle.

4. The lane-borrowing vehicle driving method of claim 3, further comprising:

receiving the driving information from at least one vehicle, wherein the driving information comprises at least one of a status, the position information, a current speed, or a driving intention of the vehicle, and receiving the traffic information from the roadside device, wherein the traffic information comprises at least one of a road condition, a traffic signal, an obstacle, or weather information.

5. The lane-borrowing vehicle driving method of claim 3, further comprising:

further receiving the lane borrowing requirement after sending the first lane-borrowing driving policy;

sending a second lane-borrowing driving policy to remaining traffic participants, other than the vehicle, that are permitted to receive the signal and that are traffic participants in the preset area, wherein the second lane-borrowing driving policy comprises at least one of second indication information, a driving sequence and speed of the traffic participant, or lane information, wherein the second indication information indicates that the vehicle is performing the lane-borrowing driving; and receiving first feedback information from the vehicle and second feedback information from the remaining traffic participants that are permitted to receive the signal, wherein the first feedback information indicates that the vehicle has received the first lane-borrowing driving policy, and wherein the second feedback information indicates that the remaining traffic participants that are permitted to receive the signal have received the second lane-borrowing driving policy.

6. The lane-borrowing vehicle driving method of claim 5, further comprising:

receiving third feedback information from the vehicle, wherein the third feedback information indicates that the vehicle has completed the lane-borrowing driving; and sending fourth feedback information to the remaining traffic participants that are permitted to receive the signal, wherein the fourth feedback information indicates to the remaining traffic participants that are permitted to receive the signal that the vehicle has completed the lane-borrowing driving.

7. The lane-borrowing vehicle driving method of claim 2, further comprising receiving fifth feedback information from the vehicle and receiving sixth feedback information from the vehicle when the control center generates the lane-borrowing requirement, wherein the fifth feedback information indicates that the vehicle has received the first lane-borrowing driving policy, wherein the sixth feedback information indicates that the vehicle has completed the lane-borrowing driving.

8. The lane-borrowing vehicle driving method of claim 7, further comprising sending a second notification message to a traffic participant that is permitted to receive a signal in a driving area for the lane-borrowing driving when the vehicle density on the lane of any direction is less than or equal to the preset threshold, wherein the second notification message instructs the traffic participant that is permitted to receive the signal in the driving area to end the lane-borrowing driving.

9. The lane-borrowing vehicle driving method of claim 1, wherein the first lane-borrowing driving policy comprises at least one of first indication information indicating that the vehicle is permitted to perform the lane-borrowing driving, a driving sequence and speed of the vehicle during the lane-borrowing driving, or lane information.

10. A lane-borrowing vehicle driving method implemented by a traffic participant, wherein the lane-borrowing vehicle driving method comprises:

determining that a lane changing condition is not satisfied;

responsive to the lane changing condition not being satisfied, receiving a first lane-borrowing driving policy from a control center, wherein the first lane-borrowing driving policy comprises an instruction for controlling lane-borrowing driving of the traffic participant; and obtaining a control parameter based on the first lane-borrowing driving policy, driving information of the traffic participant, and road condition information collected by the traffic participant, wherein the control parameter controls the lane-borrowing driving of the traffic participant.

11. The lane-borrowing vehicle driving method of claim 10, wherein the first lane-borrowing driving policy comprises at least one of first indication information indicating that a vehicle is permitted to perform the lane-borrowing driving, a driving sequence and speed of the vehicle during the lane-borrowing driving, or lane information, wherein the driving information comprises at least one of a status, position information, a current speed, or a driving intention of the traffic participant, and wherein the lane-borrowing vehicle driving method further comprises sending the driving information to the control center.

12. The lane-borrowing vehicle driving method of claim 10, wherein before receiving the first lane-borrowing driving policy, the lane-borrowing vehicle driving method further comprises:
sending a lane-borrowing requirement to the control center, wherein the lane-borrowing requirement comprises position information of the traffic participant, an expected lane-borrowing driving track, and a lane-borrowing driving reason;
wherein after completing lane-borrowing driving, the lane-borrowing vehicle driving method further comprises sending first feedback information and third feedback information to the control center, wherein the first feedback information indicates that the vehicle has received the first lane-borrowing driving policy, and wherein the third feedback information indicates that the traffic participant has completed lane-borrowing driving.

13. The lane-borrowing vehicle driving method of claim 10, further comprising receiving a notification message from the control center, wherein the notification message instructs the traffic participant to end lane-borrowing driving.

14. A control center, comprising:
a processor configured to:
determine that a lane changing condition is not satisfied;
responsive to the lane changing condition not being satisfied, generate a first lane-borrowing driving policy of a vehicle based on a lane-borrowing requirement, a moving trend of the vehicle, and a preset traffic rule, wherein the lane-borrowing requirement comprises a lane-borrowing driving reason, and wherein the first lane-borrowing driving policy comprises an instruction for controlling lane-borrowing driving; and
a transceiver coupled to the processor and configured to send the first lane-borrowing driving policy to the vehicle.

15. The control center of claim 14, wherein the transceiver is further configured to receive the lane-borrowing requirement from the vehicle, wherein the lane-borrowing requirement comprises position information of the vehicle, an expected lane-borrowing driving track, and the lane-borrowing driving reason, or the processor is further configured to generate the lane-borrowing requirement, wherein the lane-borrowing driving reason indicates that a vehicle density on a lane of any direction is greater than a preset threshold.

16. The control center of claim 15, wherein the processor is further configured to:
determine whether a road section used for the lane-borrowing driving is allowed for the lane-borrowing driving;
obtain a driving area for the lane-borrowing driving based on the lane-borrowing requirement when the road section is allowed for the lane-borrowing driving, wherein the driving area comprises a start-stop range of the road section and a quantity of lanes used for the lane-borrowing driving;
select a traffic participant in a preset area based on map information of the driving area;
send a first notification message to the traffic participant that is permitted to receive a signal in the preset area using the transceiver, wherein the first notification message indicates that the lane-borrowing driving is to occur in the driving area;
generate a dynamic traffic status in the preset area based on map information of the preset area and status information in the preset area, wherein the status information of the traffic participant comprises at least one of movement information of a pedestrian in the preset area, driving information of all vehicles, or traffic information collected by a roadside device;
obtain a moving trend of the traffic participant in the preset area within a preset time after the lane-borrowing requirement is determined based on the dynamic traffic status;
determine whether the vehicle may collide with the traffic participant in the preset area during the lane-borrowing driving in the driving area; and
further generate the first lane-borrowing driving policy based on the moving trend of the traffic participant in the preset area within a preset time after the lane-borrowing requirement is received, wherein the moving trend of the traffic participant in the preset area comprises the moving trend of the vehicle.

17. The control center of claim 16, wherein the transceiver is further configured to:
receive the driving information from at least one vehicle, wherein the driving information comprises at least one of a status, the position information, a current speed, or a driving intention of the vehicle; and
receive the traffic information from at least one roadside device, wherein the traffic information comprises at least one of a road condition, a traffic signal, an obstacle, or weather information.

18. The control center of claim 16, wherein the transceiver is further configured to:
send a second lane-borrowing driving policy to remaining traffic participants other than the vehicle that are permitted to receive the signal and that are traffic participants in the preset area, wherein the second lane-borrowing driving policy comprises at least one of second indication information, a driving sequence and speed of the traffic participant, or lane information, and wherein the second indication information indicates that the vehicle is performing lane-borrowing driving; and
receive first feedback information from the vehicle and second feedback information from the remaining traffic participants that are permitted to receive the signal, wherein the first feedback information indicates that the vehicle has received the first lane-borrowing driving policy, and wherein the second feedback information indicates that the remaining traffic participants that are permitted to receive the signal have received the second lane-borrowing driving policy.

19. The control center of claim 18, wherein the transceiver is configured to:
receive third feedback information from the vehicle, wherein the third feedback information indicates that the vehicle has completed the lane-borrowing driving; and
send fourth feedback information to the remaining traffic participants that are permitted to receive the signal, wherein the fourth feedback information indicates to the remaining traffic participants that are permitted to receive the signal that the vehicle has completed the lane-borrowing driving.

20. The control center of claim 15, wherein the transceiver is further configured to:
receive fifth feedback information from the vehicle, wherein the fifth feedback information indicates that the vehicle has received the first lane-borrowing driving policy; and
receive sixth feedback information from the vehicle, wherein the sixth feedback information indicates that the vehicle has completed lane-borrowing driving.

21. The control center of claim 20, wherein the processor is further configured to determine that the vehicle density on a lane of any direction is less than or equal to the preset threshold, wherein the transceiver is further configured to send a second notification message to a traffic participant that is permitted to receive a signal in a driving area for the lane-borrowing driving, wherein the second notification message instructs the traffic participant that is permitted to receive the signal in the driving area to end the lane-borrowing driving.

22. The control center of claim 14, wherein the first lane-borrowing driving policy comprises at least one of first indication information used to indicate that the vehicle is permitted to perform the lane-borrowing driving, a driving sequence and speed of the vehicle during the lane-borrowing driving, or lane information.

23. A traffic participant, comprising:
a processor configured to determine that a lane changing condition is not satisfied; and
a transceiver coupled to the processor and configured to receive, responsive to the lane changing condition not being satisfied, a first lane-borrowing driving policy from a control center, wherein the first lane-borrowing driving policy comprises an instruction for controlling lane-borrowing driving of the traffic participant,
wherein the processor is further configured to obtain a control parameter based on the first lane-borrowing driving policy, driving information of the traffic participant, and road condition information collected by the traffic participant, wherein the control parameter controls the lane-borrowing driving of the traffic participant.

24. The traffic participant of claim 23, wherein the first lane-borrowing driving policy comprises at least one of first indication information used to indicate that a vehicle is permitted to perform the lane-borrowing driving, a driving sequence and speed of the vehicle during the lane-borrowing driving, or lane information, wherein the driving information comprises at least one of a status, position information, a current speed, and a driving intention of the traffic participant, and wherein the transceiver is further configured to send the driving information to the control center.

25. The traffic participant of claim 23, wherein the transceiver is further configured to:
send a lane-borrowing requirement to the control center, wherein the lane-borrowing requirement comprises position information of the traffic participant, an expected lane-borrowing driving track, and a lane-borrowing driving reason; and
send first feedback information and third feedback information to the control center, wherein the first feedback information indicates that a vehicle has received the first lane-borrowing driving policy, and wherein the third feedback information indicates that the traffic participant has completed the lane-borrowing driving.

26. The traffic participant of claim 23, wherein the transceiver is further configured to receive a notification message from the control center, wherein the notification message instructs the traffic participant to end the lane-borrowing driving.

27. A communications apparatus, comprising:
a processor; and
a memory coupled to the processor and storing instructions that, when executed by the processor, cause the communications apparatus to be configured to:
determine that a lane changing condition is not satisfied;
responsive to the lane changing condition not being satisfied, generate a first lane-borrowing driving policy of a vehicle based on a lane-borrowing requirement, a moving trend of the vehicle, and a preset traffic rule, wherein the lane-borrowing requirement comprises a lane-borrowing driving reason, and wherein the first lane-borrowing driving policy comprises an instruction for controlling lane-borrowing driving of the vehicle; and
send the first lane-borrowing driving policy to the vehicle.

28. A computer program product comprising computer-executable instructions for storage on a non-transitory computer-readable medium that, when executed by a processor, cause the processor to:
determine that a lane changing condition is not satisfied;
responsive to the lane changing condition not being satisfied, generate a first lane-borrowing driving policy of a vehicle based on a lane-borrowing requirement, a moving trend of the vehicle, and a preset traffic rule, wherein the lane-borrowing requirement comprises a lane-borrowing driving reason, and wherein the first lane-borrowing driving policy comprises an instruction for controlling lane-borrowing driving of the vehicle; and
send the first lane-borrowing driving policy to the vehicle.

* * * * *